United States Patent
Ayyagari et al.

(10) Patent No.: US 7,856,008 B2
(45) Date of Patent: Dec. 21, 2010

(54) SYNCHRONIZING CHANNEL SHARING WITH NEIGHBORING NETWORKS

(75) Inventors: Deepak V. Ayyagari, Vancouver, WA (US); Wai-Chung Chan, Vancouver, WA (US); Sherman L. Gavette, Camas, WA (US); Lawrence W. Yonge, III, Ocala, FL (US); Yiorgos Peponides, San Diego, CA (US); Neal Riedel, Carlsbad, CA (US)

(73) Assignee: Sharp Laboratories of America, Inc., Camas, WA (US)

( * ) Notice: Subject to any disclaimer, the term of this patent is extended or adjusted under 35 U.S.C. 154(b) by 637 days.

(21) Appl. No.: 11/421,155

(22) Filed: May 31, 2006

(65) Prior Publication Data

US 2007/0025384 A1 Feb. 1, 2007

Related U.S. Application Data

(60) Provisional application No. 60/703,236, filed on Jul. 27, 2005.

(51) Int. Cl.
 *H04J 3/06* (2006.01)
 *H04W 4/00* (2009.01)
 *H04B 1/16* (2006.01)
 *H04B 7/00* (2006.01)
(52) U.S. Cl. .................. 370/350; 455/502; 455/208; 455/422.1
(58) Field of Classification Search .................. 455/402, 455/448, 502; 370/350
See application file for complete search history.

(56) References Cited

U.S. PATENT DOCUMENTS

| 4,977,593 | A | 12/1990 | Ballance |
| 5,142,578 | A | 8/1992 | Matyas et al. |
| 5,185,796 | A | 2/1993 | Wilson |
| 5,204,903 | A | 4/1993 | Okada et al. |
| 5,887,063 | A | 3/1999 | Varadharajan et al. |
| 5,987,331 | A | 11/1999 | Grube et al. |

(Continued)

FOREIGN PATENT DOCUMENTS

EP   0 844 563 B1   1/2003

(Continued)

OTHER PUBLICATIONS

David Ruiz et al., "In-Home AV PLC MAC with Neighboring Networks Support," IEEE, 2005, p. 17, rt. hand col., line 14-p. 20, rt. hand col., line 16; and Figs. 2,3,& 6.

(Continued)

*Primary Examiner*—Huy Phan
*Assistant Examiner*—Kathy Wang-Hurst
(74) *Attorney, Agent, or Firm*—Michael Blaine Brooks, P.C.; Michael B. Brooks; David Ripma

(57) ABSTRACT

The embodiments of the present invention provide a mechanism to synchronize centralized networks. Each centralized network includes a central coordinator controlling and managing network activities. The embodiments provide a way of allocating beacon slots, such that one of the beacon slots is synchronized to the alternating current line cycle and thus functions as a master timing sequence. In some embodiments, methods, devices, and systems are provided for detecting transmissions of non-coordinating networks.

19 Claims, 14 Drawing Sheets

U.S. PATENT DOCUMENTS

| | | | |
|---|---|---|---|
| 6,097,817 A | 8/2000 | Bilgic et al. | |
| 6,526,581 B1 | 2/2003 | Edson | |
| 6,559,757 B1* | 5/2003 | Deller et al. | 370/206 |
| 6,587,453 B1 | 7/2003 | Romans et al. | |
| 6,594,268 B1 | 7/2003 | Aukia et al. | |
| 6,759,946 B2 | 7/2004 | Sahinoglu et al. | |
| 6,775,280 B1 | 8/2004 | Ma et al. | |
| 6,782,476 B1 | 8/2004 | Ishibashi | |
| 6,807,146 B1 | 10/2004 | McFarland | |
| 6,901,064 B2 | 5/2005 | Cain et al. | |
| 7,200,147 B2 | 4/2007 | Shin et al. | |
| 7,212,513 B2 | 5/2007 | Gassho et al. | |
| 7,233,804 B2* | 6/2007 | Sugaya et al. | 455/501 |
| 7,242,932 B2 | 7/2007 | Wheeler et al. | |
| 7,330,457 B2 | 2/2008 | Panwar et al. | |
| 7,339,457 B2 | 3/2008 | Trochesset | |
| 7,342,896 B2 | 3/2008 | Ayyagari | |
| 7,356,010 B2 | 4/2008 | He et al. | |
| 7,496,078 B2 | 2/2009 | Rahman | |
| 7,506,042 B2 | 3/2009 | Ayyagari | |
| 2001/0048692 A1 | 12/2001 | Karner | |
| 2002/0116342 A1 | 8/2002 | Hirano et al. | |
| 2002/0150249 A1 | 10/2002 | Ohkita et al. | |
| 2002/0163933 A1 | 11/2002 | Benveniste | |
| 2003/0038710 A1 | 2/2003 | Manis et al. | |
| 2003/0039257 A1 | 2/2003 | Manis et al. | |
| 2003/0051146 A1 | 3/2003 | Ebina et al. | |
| 2003/0056014 A1 | 3/2003 | Verberkt et al. | |
| 2003/0066082 A1 | 4/2003 | Kliger et al. | |
| 2003/0198246 A1 | 10/2003 | Lifshitz et al. | |
| 2003/0203716 A1 | 10/2003 | Takahashi et al. | |
| 2003/0231607 A1* | 12/2003 | Scanlon et al. | 370/338 |
| 2004/0013135 A1 | 1/2004 | Haddad | |
| 2004/0066783 A1 | 4/2004 | Ayyagari | |
| 2004/0075535 A1 | 4/2004 | Propp et al. | |
| 2004/0165728 A1 | 8/2004 | Crane et al. | |
| 2004/0174829 A1 | 9/2004 | Ayyagari | |
| 2004/0214570 A1 | 10/2004 | Zhang et al. | |
| 2005/0015805 A1 | 1/2005 | Iwamura | |
| 2005/0033960 A1 | 2/2005 | Vialen et al. | |
| 2005/0041673 A1 | 2/2005 | Jiang et al. | |
| 2005/0124293 A1* | 6/2005 | Alicherry et al. | 455/41.2 |
| 2005/0149757 A1 | 7/2005 | Corbett et al. | |
| 2005/0169222 A1 | 8/2005 | Ayyagari et al. | |
| 2005/0170835 A1 | 8/2005 | Ayyagari et al. | |
| 2005/0174950 A1 | 8/2005 | Ayyagari | |
| 2005/0193116 A1 | 9/2005 | Ayyagari et al. | |
| 2005/0243765 A1* | 11/2005 | Schrader et al. | 370/328 |
| 2006/0007907 A1* | 1/2006 | Shao et al. | 370/347 |
| 2006/0031477 A1 | 2/2006 | Ayyagari | |
| 2009/0238153 A1* | 9/2009 | Sim | 370/336 |

FOREIGN PATENT DOCUMENTS

| | | |
|---|---|---|
| EP | 1 693 998 A1 | 8/2006 |
| WO | WO 03/015291 A2 | 2/2003 |
| WO | WO 03/026224 A1 | 3/2003 |
| WO | WO 2005/062546 A1 | 7/2005 |

OTHER PUBLICATIONS

Ayyagari, Deepak,"High Speed Home Networking for AV and IP Applications using existing Powerline Infrastructure,"Dec. 2004,p. 65-72,paras:[0001]&[0004],Sharp Technical Journal.

Schneier, Bruce, "Applied Cryptography,"1996, John Wiley & Sons, Inc., Second Edition, pp. 34-38, pp. 48-49, pp. 513-514, and pp. 518-520.

Non-Final Office action for U.S. Appl. No. 11/420,432, dated Apr. 28, 2009.

Final Office action for U.S. Appl. No. 11/420,432, dated Nov. 23, 2009.

Non-Final Office action for U.S. Appl. No. 11/420,432, dated Mar. 25, 2010.

Advisory Action for U.S. Appl. No. 11/388,584 dated Mar. 23, 2010.

Final Office action for U.S. Appl. No. 11/388,584 dated Jan. 7, 2009.

Final Office action for U.S. Appl. No. 11/388,584 dated Jan. 13, 2010.

Non-Final Office action for U.S. Appl. No. 11/388,584, dated Jun. 25, 2009.

Non-Final Office action for U.S. Appl. No. 11/388,584, dated Oct. 6, 2008.

Non-Final Office action for U.S. Appl. No. 11/420,945, dated Jan. 29, 2009.

Non-Final Office action for U.S. Appl. No. 11/420,945, dated Jul. 8, 2009.

Notice of Allowance for U.S. Appl. No. 11/420,945 dated May 5, 2010.

Final Office action for U.S. Appl. No. 11/388,869 dated Jan. 14, 2010.

Non-Final Office action for U.S. Appl. No. 11/388,869 dated Jun. 10, 2009.

Non-Final Office action for U.S. Appl. No. 11/388,869 dated Jul. 7, 2010.

Notice of Pre-Appeal Brief for U.S. Appl. No. 11/388,584 dated Jun. 16, 2010.

Final Office action for U.S. Appl. No. 11/420,432 mailed Aug. 31, 2010.

Notice of Allowance for U.S. Appl. No. 12/728,040 dated Aug. 23, 2010.

\* cited by examiner

SYNCHRONIZING CHANNEL SHARING WITH NEIGHBORING NETWORKS

CROSS-REFERENCE TO RELATED APPLICATIONS

This application claims the benefit of U.S. Provisional Patent Application Ser. No. 60/703,236 filed Jul. 27, 2005, entitled "Method for Sharing a Channel with Neighboring Networks," which is hereby incorporated by reference herein for all purposes.

FIELD OF THE INVENTION

The present invention is related to multiple networks, particularly to channel sharing between multiple networks.

BACKGROUND

In situations where multiple networks share a common communication medium or channel, the networks may compete for access to the channel, e.g., compete for bandwidth. In the absence of coordination between these networks, they may interfere with one another, thereby reducing capacity utilization and bandwidth available to stations within any network.

SUMMARY

According to an embodiment of the present invention, a method of synchronizing one or more networks in a first group is provided. Each of the one or more networks, in the first group, includes a central coordinator adapted to operate in the uncoordinated operating mode or in the coordinated operating mode. The central coordinator is further adapted to transition from the uncoordinated mode to the coordinated mode or from the coordinated mode to the uncoordinated mode. This method comprises the steps of: allocating one or more beacon slots wherein each beacon slot is associated with a unique network from the networks in the first group; and transmitting at least one beacon at the allocated beacon slot by the associated network. The transmitted beacon includes network allocation and scheduling information. Furthermore, one of the allocated beacon slots is a master slot that is synchronized to the alternating current (AC) line cycle thus functioning as a master timing sequence.

In another embodiment of the invention, a device is provided. This device comprises a beacon slot allocation module, an AC line cycle synchronization module, a beacon decoding module, and a network operating module. The beacon slot allocation module is adapted to allocate one or more beacon slots, wherein each allocated beacon slot is associated with one unique network that includes a central coordinator. Furthermore, the beacon slot allocation module is further adapted to release one of the allocated beacon slots. The released beacon slot is adapted to be associated with another new network. The AC line cycle synchronization module, on the other hand, is adapted to monitor the AC line cycle and to synchronize at least one of the allocated beacon slots to the AC line cycle. Moreover, the beacon decoding module is adapted to decode one or more detected beacons; while the network operating mode module is adapted to determine, based on at least one of the decoded beacons, the network operating mode selected from the group consisting of coordinated mode and uncoordinated mode.

In another embodiment of the invention, a system is provided. This system comprises one or more networks and a power line communication network medium operably coupled to the one or more networks. Each network in this system includes a central coordinator that controls its network. Each network operates in a mode selected from a group consisting of a coordinated mode and an uncoordinated mode. Furthermore, each of the central coordinator is adapted to allocate one or more beacon slots within a beacon region, wherein each beacon slot is associated with a unique network. Furthermore, at least one of the one or more beacon slots is synchronized to an alternating current line cycle functioning as a master timing sequence.

In another embodiment of the invention, a method of synchronizing a first centralized network and a second centralized network is provided. The first centralized network includes a first central coordinator and a station that is adapted to detect transmissions from the second centralized network. The second centralized network includes a central coordinator. The method includes the steps of monitoring, by the station, for a transmission from the second centralized network within a detect time interval specified by the first central coordinator; reporting, by the station, after the specified detect time interval at least one of the following: presence of the transmission; and absence of the transmission; and if absence of the transmission is reported, assigning, by the first central coordinator, the specified time interval to the first station.

In another embodiment of the invention, a device that is adapted to be operably coupled to a first centralized network is provided. The first centralized network includes a central coordinator. The device includes a detect-and-report procedure module and an input/output interface. The detect-and-report procedure module is adapted to receive one or more detect time intervals; monitor for one or more transmissions from one or more non-coordinating centralized networks within the received one or more detect time intervals; and report to the central coordinator at least one of the following: presence of the one or more transmissions, and absence of the one or more transmissions. The input/output interface is adapted to enable the device to communicate with the first centralized network.

In another embodiment of the invention, a central coordinator device is provided. This device is adapted to be operably coupled to a first centralized network and a station. The device includes a detect-and-report procedure module and an input/output interface that is adapted to enable the device to communicate with the first centralized network. The detect-and-report procedure module is adapted to transmit, to the station, a request to perform monitoring of transmissions from non-coordinating networks of the device, wherein the request comprises one or more time intervals; receive a response indicating at least one of the following: presence of the monitored transmissions, and absence of the monitored transmissions; and allocate the one or more time intervals to the station based on the received response.

BRIEF DESCRIPTION OF THE DRAWINGS

The present invention is illustrated by way of example and not limitation in the figures of the accompanying drawings, and in which.

DETAILED DESCRIPTION OF THE INVENTION

Figure 1:
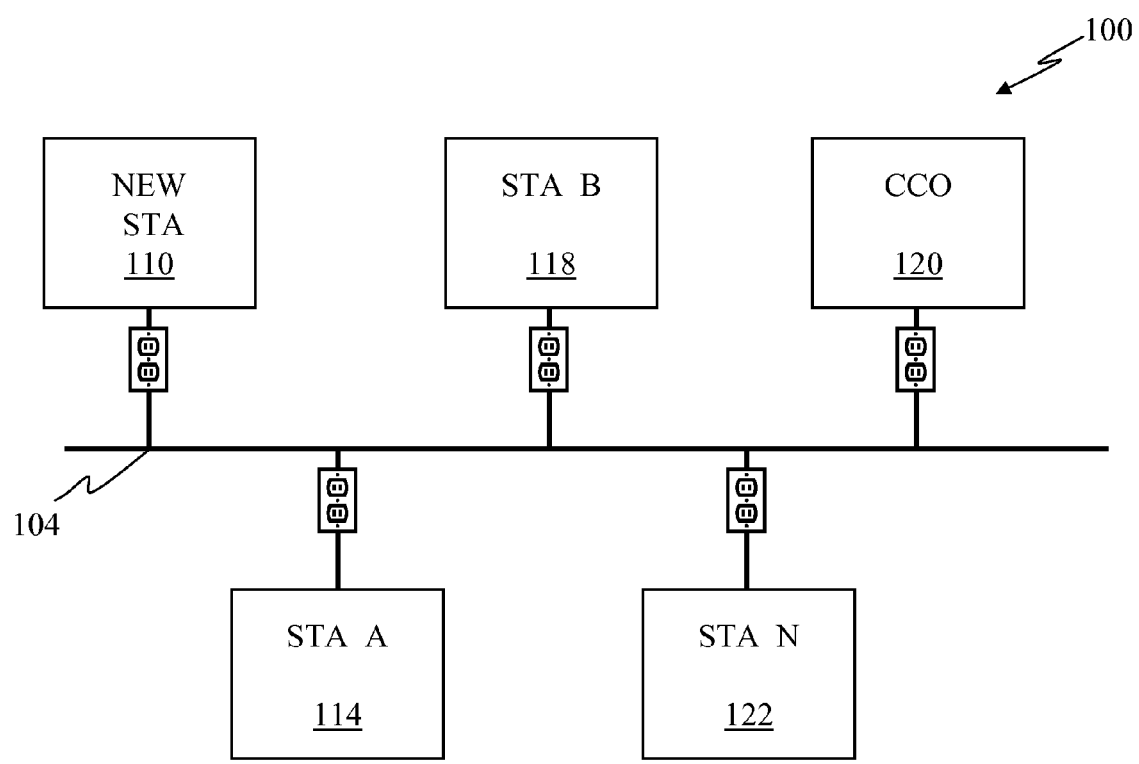
FIG. 1 is a high-level block diagram of an exemplary network according to an embodiment of the invention.
Figure 2:
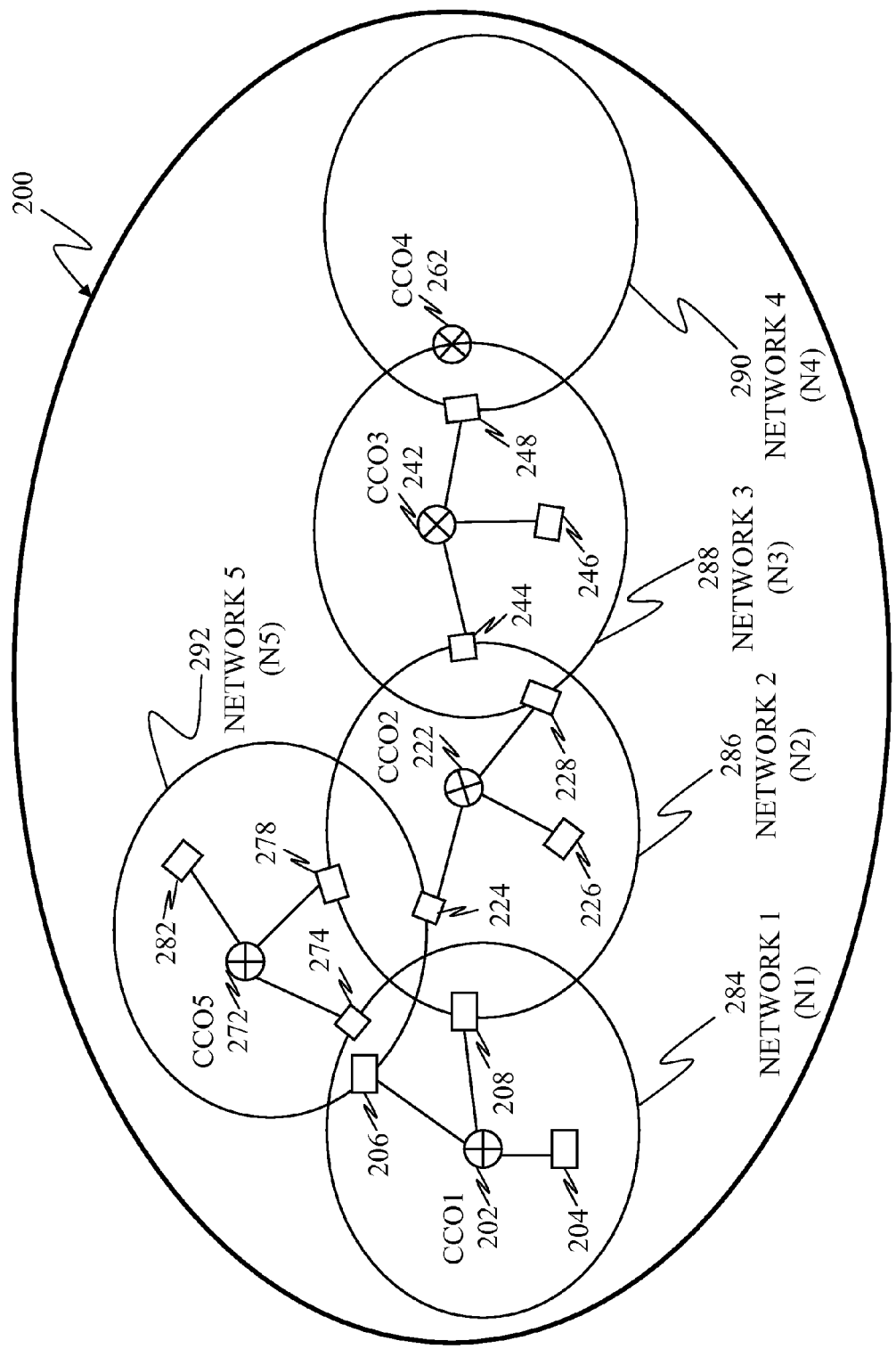
FIG. 2 is an exemplary group of networks according to an embodiment of the invention.

To better understand the figures, reference numerals within the one hundred series, for example, 100 and 118, are initially introduced in FIG. 1, reference numerals in the two hundred series, for example, 200 and 222, are initially introduced in FIG. 2, and so on and so forth. So, reference numerals in the eight hundred series, e.g. 804 and 820, are initially introduced in FIG. 8.

FIG. 1 is a high-level block diagram of an exemplary network 100 according to an embodiment of the invention. The network 100 is a centralized network (CN) that includes a central network coordinator also called the central coordinator (CCO) 120 that controls network activities, such as network timing, bandwidth allocation, and security, e.g., authentication and key management. For each centralized network 100, there is typically one instance of a CCO 120 and zero or more stations/devices 110, 114, 118, 122. Any station (STA), however, may function as the CCO provided it has the sufficient management functionality. In some embodiments, the network is a power line communication (PLC) network. Stations that may be connected to this PLC network include devices such as monitors, TVs, VCRs, DVD player/recorders, other audiovisual devices, computers, game consoles, sound systems, information appliances, smart-home technology appliances, home audio equipment, or any other device that is PLC-enabled or compatible, or is able to communicate via the power lines. In another embodiment, the PLC network utilizes time-division multiplexing procedures and technologies, such as TDMA. Although the embodiments of the invention herein are exemplified and discussed using power line networks, features of the present invention are also relevant to other networks; for example, but not limited to, networks that have a centralized architecture with a central coordinator controlling the activities of the stations in the network. The use of power line networks in exemplary configurations is intended to aid in understanding the features of the several embodiments of the invention.

In one embodiment of the invention, the network may use time division multiplexing (TDM) as a method of multiple data streams sharing a signal according to time segments. The data streams may be reconstructed according to their time slots. In general, TDM enables several users/stations to share the same frequency by dividing it into different time slots. The stations transmit in rapid succession, one after the other, each using their own defined time slot. TDMA and TDM are techniques known to those of ordinary skill in the art and may be used with PLC technology. The networks of the present invention may also use other time-division multiplexing technology, and other technology such as orthogonal frequency-division or combinations and variations thereof. Other technologies supporting PLC, e.g., orthogonal frequency-division multiplexing (OFDM), however, may also be used within the network.

FIG. 2 is a diagram showing an exemplary group 200 of networks 284, 286, 288, 290, 292—e.g., similar to network 100 in FIG. 1, according to an embodiment of the invention. A network group 200 is typically a collection of one or more networks that have the same system timing, i.e., the beacon periods of these networks align with each other. In another embodiment, there may be two or more groups of networks, not shown, in the vicinity of each other.

A power line medium may be shared by multiple devices, which may interfere with each other. In some embodiments, each CCO typically maintains an Interfering Network List (INL). The INL of a CCO (or of a centralized network) typically contains the list of networks that coordinate with and interfere with the network controlled by the CCO. In some embodiments, an assumption is made that if two CCOs are able to detect each other's beacon transmissions, the two networks controlled by the two CCOs, including all their stations, interfere with each other. In some embodiments, the CCO of each network, for example at network initialization, determines its INL by decoding all existing beacons. The CCO may also monitor existing beacons to update its INL, if appropriate, as existing neighboring networks are shut down and new neighboring networks are established.

In this exemplary group of networks 200, there are five exemplary networks 284, 286, 288, 290, and 292. Each network typically includes one central coordinator and zero or more stations. Exemplary network 1 (N1) 284 includes a central coordinator, CCO1 202, and three stations 204, 206, and 208; network 2 (N2) 286 includes CCO2 222 and three stations 224, 226, 228; network 3 (N3) 288 includes CCO3 242 and three stations 244, 246, 248; network 4 (N4) 290 includes CCO4 262; and network 5 (N5) 292 includes CCO5 272 and three stations 274, 278, 282. Network 1 (N1), in this exemplary embodiment, has multiple neighbor networks, i.e., N2 286, N3 288, N4 290, and N5 292. As another example, network 3 (N3) has neighbor networks N1 284, N2 286, N5 292, and N4 290.

In this exemplary group 200, N1 284 interferes with N5 292 and N2 286, i.e., CCO1 202 is able to detect the beacons of CCO5 272 and CCO2 222. Furthermore, N2 286 interferes with N1 284, N5 292, and N3 242; N3 288 interferes with N4 290 and N2 286; and N5 interferes with N1 284 and N2 286. Thus, in this exemplary embodiment, CCO1 202 has an INL that includes both N5 292 and N2 286. In one embodiment, information contained in the INL includes the network ID—an identifier that uniquely identifies the network—of that interfering network or CCO, the beacon slot or time slot number/ID with which the interfering network or CCO transmits its beacon, and terminal identification information, such as address or temporary equipment ID, of the interfering CCO. In one embodiment, a CCO within a group is able to request and exchange INL information with other CCOs within the group, and, optionally, outside of the group. In another embodiment, network coordination is performed between interfering networks that are in the same group. In another embodiment of the invention, network coordination between interfering networks that are in different groups is optional.

In some embodiments, each CCO maintains its own topology table. This table may identify stations within the network, as well as the devices that those stations, including CCOs, are able to communicate and/or detect. In some embodiments, the topology table may identify stations, including CCOs, from other networks that the devices are able to communicate and/or detect. The topology table may also maintain information about CNs present within and/or outside the system. This table is typically updated, e.g., periodically. The topology table may also include the INL. In general, the topology table provides information about devices, e.g., STAs and CCOs, and centralized networks within the system. The topology table may also include all STAs associated and authenticated with the CCO. In some embodiments, it may contain the MAC addresses of all STAs and the network identifiers of all networks detected by every STA associated and authenticated with the CCO.

Beacons:

In some embodiments, the CCO manages the activities of devices within its network using, for example, beacons. Beacons are typically control messages that identify the frame configuration and the bandwidth (BW) assignments within a time frame to multiple networks and to devices within a given network. Beacons are typically broadcasted by each CCO, e.g., as a multi-network broadcast, and are decoded by the stations within the network and, in some embodiments by the CCOs of neighbor networks, including those that may be outside of the group. Beacons are also typically tagged or identified, such that stations within a network decode and follow the BW allocation of their own network beacon and not the beacon of another network. Beacons are also transmitted or broadcasted, typically periodically, into the networks. They may also be transmitted unencrypted. In an alternative embodiment, beacons or portions thereof are encrypted. In general, a beacon may contain other information, such as, but not limited to, MAC address of the CCO, check sum values, and management and control information.

Figure 3A:
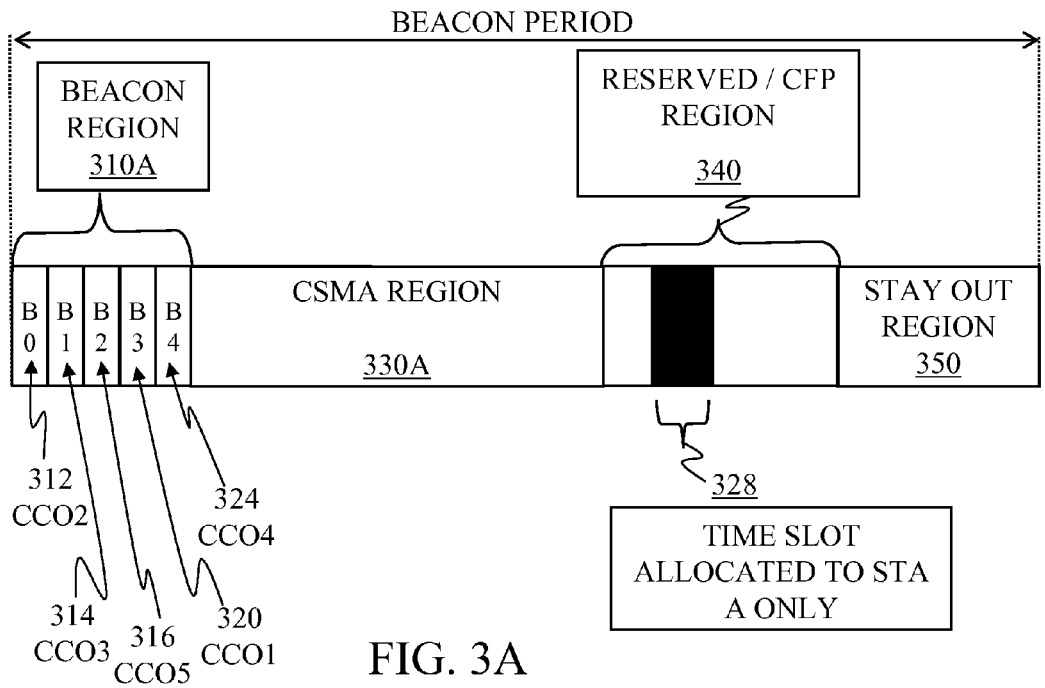
FIGS. 3A and 3B show exemplary beacons according to embodiments of the invention.

FIG. 3A is an exemplary diagram of a beacon period for a network. In some embodiments of the invention, a beacon comprises several parts or regions. Each region is further typically defined into one or more time slots (e.g., 312, 314, 316, 320, 324, and 328). In some embodiments, a beacon comprises four regions:

Beacon Region:

In some embodiments, a beacon region 310A is the region wherein a CCO is able to transmit its own beacon. The beacon region generally includes a plurality of a certain number of beacons or time slots, with the duration of each beacon slot typically sufficient for the transmission of a beacon. In one embodiment, the duration of each beacon slot is equal to the sum of the duration of a beacon PHY protocol data unit (PPDU) and the interframe space. A beacon region 310A, in one embodiment, consists of one to a maximum number—typically defined within the system of time slots or beacon slots. In one embodiment, the size of the beacon region, including the number of time slots, may be adjusted dynamically by the CCO. In one embodiment, each CCO typically transmits a beacon in one of the beacon slots—allocated for that CCO—within the beacon region every beacon period. In one embodiment, information or data about the beacon region and/or time slots within the beacon region—for example, the number of beacon slots within the beacon region, the beacon slot ID that the CCO is using to transmit its current beacon protocol data unit, and/or the start and/or end time—are kept by the CCO and/or by the CCO of the other neighbor networks.

In a typical embodiment, each CCO, in a group of networks, particularly those in the coordinated mode, is associated with a distinct time slot, such that if there are five CCOs within a group, five time slots are allocated to transmit each of their respective beacons. In general, beacon slots are typically not reused, i.e., each beacon slot may be used by at most one network. This means that even if a CCO is able to determine a beacon slot that it is able to transmit without colliding and with another network, for example, a beacon slot of a non-interfering network in the group, that beacon slot may not be used. For example, although N1 284 is not interfering with N4 290, in this embodiment of the invention, CCO4 262 may not use the same beacon slot number used by CCO1 202 (see FIG. 2). Each CCO transmits at its own unique associated or allocated time slot, facilitating identification of the transmitting CCO when a beacon is heard, for example, at a particular time slot.

Furthermore, in a typical embodiment, the number of beacon slots in the beacon region is the same for all networks in the coordinated mode that are operating and that belong to the same group. If group coordination is performed, coordinating networks that are in different groups typically specify a sufficiently long protected region that overlaps with the beacon region of the other group.

In FIG. 3A, the beacon region includes five time slots, enabling each of the CCOs in the five networks, e.g., in FIG. 2, to transmit its own beacon. In this example, CCO2 222, CCO3 242, CCO5 272, CCO1 202, and CCO4 262 transmit their beacons at time slots B0 312, B1 314, B2 316, B3 320, and B4 324, respectively. Each distinct or unique network in the group thus typically has its own defined time or beacon slot to transmit its beacon, regardless of whether the networks interfere with each other or not. In one embodiment, the number of beacon slots may be increased to accommodate new CCOs and networks.

Figure 3B:
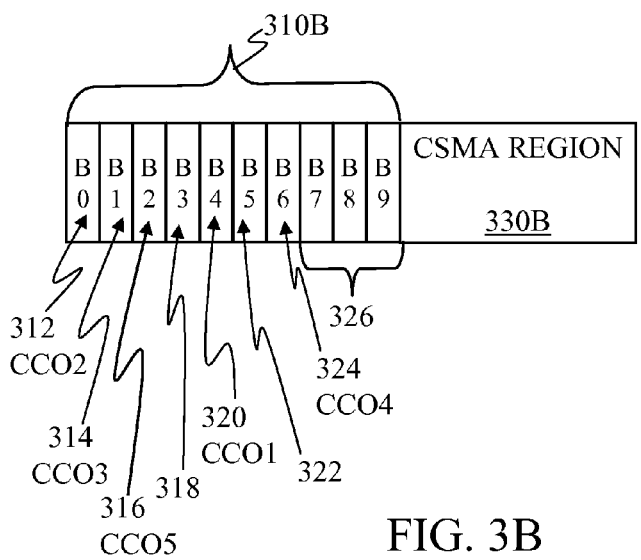

In this embodiment, FIG. 3B is a variation of FIG. 3A, the beacon region 310B is an exemplary variation of the above beacon region 310A and contains a defined number of time slots, e.g., there are ten slots within the beacon region 310B. This defined number may be adjusted within the system. The time slots in the beacon region 310B, for example, B5 322, B7, B8, and B9 326 are identified or tagged as being unallocated or unused, and thus may be used by future or new incoming CCOs, if appropriate. The CSMA region 330B in FIG. 3B is shorter than the above CSMA region 330A.

In some embodiments, the number of beacon slots in the beacon region is a fixed rather than a variable number. In these embodiments, a limited number of messages or no messages are exchanged to enable neighbor networks to operate in the coordinated mode. In some embodiments, the beacon transmitted by each CCO contains information about the occupancy of the beacon slots in the beacon region. From this information, a new CCO may then determine a vacant beacon slot to transmit its new beacon in such a way that its beacon will not collide with that of its neighbor networks. In some embodiments, a certain number of beacon slots may be reserved for the transmission of beacons. In other embodiments, the beacons may be transmitted in any time interval or time slot that is not being reserved. In some embodiments, the fixed number of beacon slots may be defined by a user and may be altered, for example, upon system reset or by a user changing a configuration file.

Carrier Sense Multiple Access (CSMA) Region or Contention Period (CP) Region:

The CSMA region 330A, 330B is a region wherein any one or more of many contention access protocols are used to share the medium and to coordinate network traffic. In some embodiments, a CSMA/CA protocol may be used. A network may have one or more CP or CSMA regions. In one embodiment, the CSMA or CP regions of one network do not overlap with the reserved or contention-free period regions of other networks in its INL. Communication, however, between two or more interfering networks may be made during overlapping CSMA regions.

For each network, a "minimum CSMA region" (MinCS-MARegion) immediately following the beacon region is typically supported. The minimum CSMA region, together with other CSMA regions, located elsewhere in the beacon period, for example, may be used for the following:

Exchange of priority-based user data between STAs using CSMA, e.g., CSMA/CA;
New STAs, including CCOs, to associate with the network;
Existing STAs to exchange management messages with the CCO (e.g., to set up a new link);
New CCOs to exchange management messages to establish new neighbor networks; and
Existing neighbor coordinators (NCCOs) to exchange management messages with the CCO (e.g., to share bandwidth, or to change the number of beacon slots).

Furthermore, in some embodiments, the allocation of a minimum CSMA region immediately following the beacon region enables the beacon region to increase or decrease in size without requiring a change in the schedule or locations in time within the frame, particularly of contention-free period time slots. Moreover, this enables new devices joining the centralized network to know where a CSMA region exists even if they cannot hear other beacons. The new or joining station or device may then transmit network associate request messages, for example, messages requesting that the device be enabled to associate with the centralized network, within this minimum CSMA region or time slot.

Reserved Region or Contention-Free-Period (CFP) Region:

This reserved or CFP region 340 is a period when only stations or devices that have explicit authorization from the CCO are allowed to transmit. A reserved region is a time interval that is typically reserved by a network. The network that has been allocated or has acquired control of the reserved region typically schedules the transmission of its contention-free links here. In addition, the CCO may also schedule CSMA allocations that may be used only by the STAs in that network. For example, time slot 328 in the reserved region 340 has been allocated by the CCO to STA A 114, so that STA A 114 may freely transmit at that time slot or interval 328 without interference, conflict, or contention from other stations within the network. Explained in another way, in that time slot 328, STA A may freely transmit, while other stations in that network or other neighbor networks in the group are typically silent. This allocation is typically via beacons, such that when a station decodes its own network beacon, information about which station is to use that time slot may also be defined within that beacon. In another embodiment, the CCO sends a message directly to the station informing that station when to transmit and sometimes even listen.

A network may have any number of reserved regions in a beacon period. To be compatible, other networks in its INL specify a stayout region in the same time interval, thereby enabling the device with explicit authorization to freely transmit. In one embodiment, it is possible to have two non-interfering networks specify a reserved region in the same interval. This results in channel reuse with a higher total capacity. Referring back to FIG. 2, for example, considering that N1 284 does not interfere with N4 290, N1 and N4 may, in one embodiment, both specify a reserved region in the same time interval.

Stayout Region:

The stayout region 350 is a period within the time frame when all stations assigned a stayout region are instructed by the CCO to remain silent, meaning no transmission. Typically, these devices are also not to use any contention access or contention-free access protocol. A stayout region is assigned to avoid conflicts with a device or the network that has been assigned a reserved region in the same time interval. In general, a network specifies a stayout region if one or more of the neighboring networks in its INL have specified a reserved region or a protected region in the same time interval.

In some embodiments of the invention, information about beacon regions, including the number of time slots are kept within the system, typically by the CCO in each network. Information about beacon slot allocations in the beacon region, as well as information about the other regions, in one embodiment, may be exchanged between CCOs. Furthermore, in some embodiments, the various types of regions need not be allocated in one contiguous time interval. This means for example, that the various types of regions may interleave each other, e.g., a time frame or beacon period includes a beacon region, followed by a CSMA region, followed by a stayout region, followed by another CSMA region, and then followed by a reserved region. The various regions within a beacon period may also be of varying sizes with varying number of time slot intervals or durations. In one embodiment, the end time of each region type within a beacon period is stored, for example, in multiples of a defined allocation time unit (e.g., "AllocationTimeUnit"), e.g., 0.32 msec.

In another alternative embodiment, a beacon period may include another region type (not shown) called a Protected Region. When a CCO detects the existence of another group with a different timing and if it optionally decides to coordinate with networks in that group, that CCO typically specifies a protected region in the same interval where the beacon region of the other group is located. Stations in a network typically are not allowed to transmit in a protected region. Group coordination, in one embodiment, is optional. A neighboring group of networks, for example, may have a different beacon period start time.

In some embodiments, a network in uncoordinated mode has a beacon period structure that consists of a beacon region followed by a CSMA region, e.g., CSMA/CA region, optionally followed by one or more reserved regions and CSMA regions. Typically, the duration of the reserved regions and CSMA regions are carried in the beacon.

Based on the beacons transmitted by the CCO, the devices within a network are able to share bandwidth using the same medium or channel, e.g. power line medium. The CCO in each network thus typically controls BW allocation and scheduling within its network. The stations within the network thus decode their own network beacons, and accordingly perform their functions, such as network transmission, following the beacon period allocations or schedule. In one embodiment, a beacon may also contain other or additional information, such as: a network identifier to identify the network; an alternating current (AC) line cycle synchronized flag indicating whether the beacon transmission is synchronized or substantially synchronized with the AC line cycle; a source terminal identifier identifying the device transmitting the beacon; a beacon slot ID identifying the beacon slot used by the sender of the beacon; beacon slot usage indicating the beacon slots used in the group; and handover-in-progress flag indicating whether the functions or some of the functions of the CCO are being transferred to another CCO.

Figure 4:
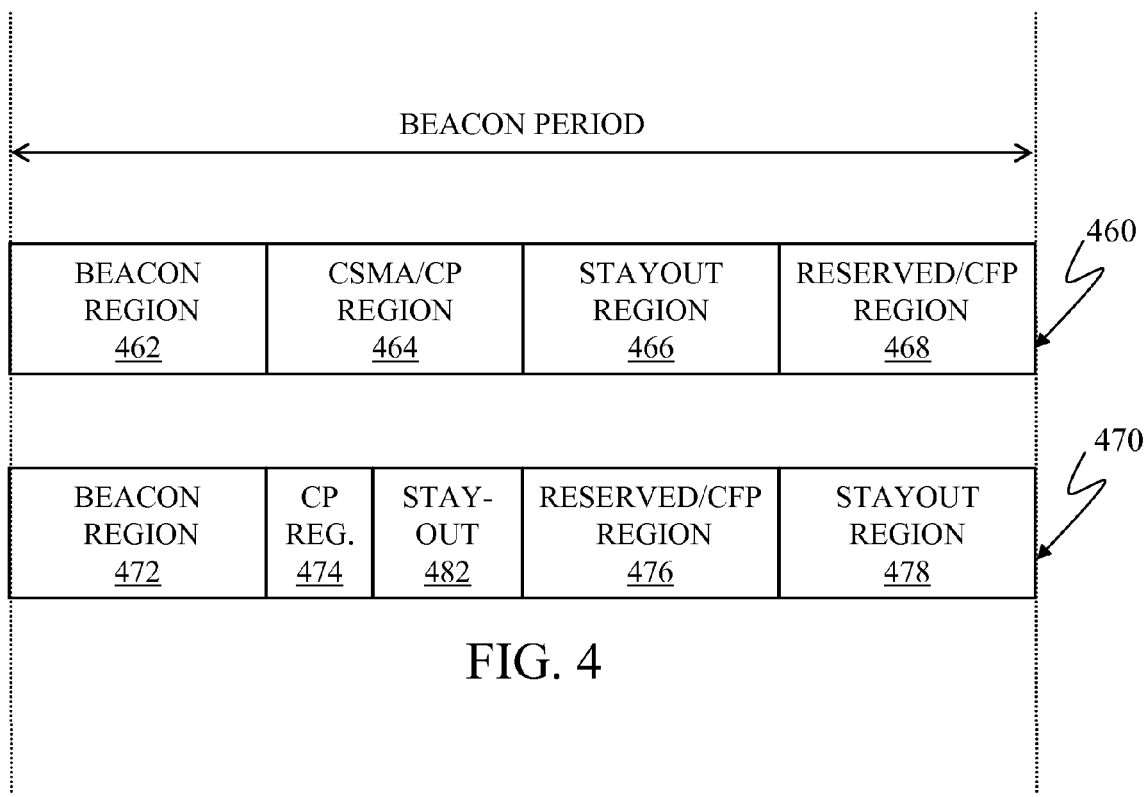
FIG. 4 shows two exemplary beacons with compatible beacon structures, according to an embodiment of the invention.
Figure 5:
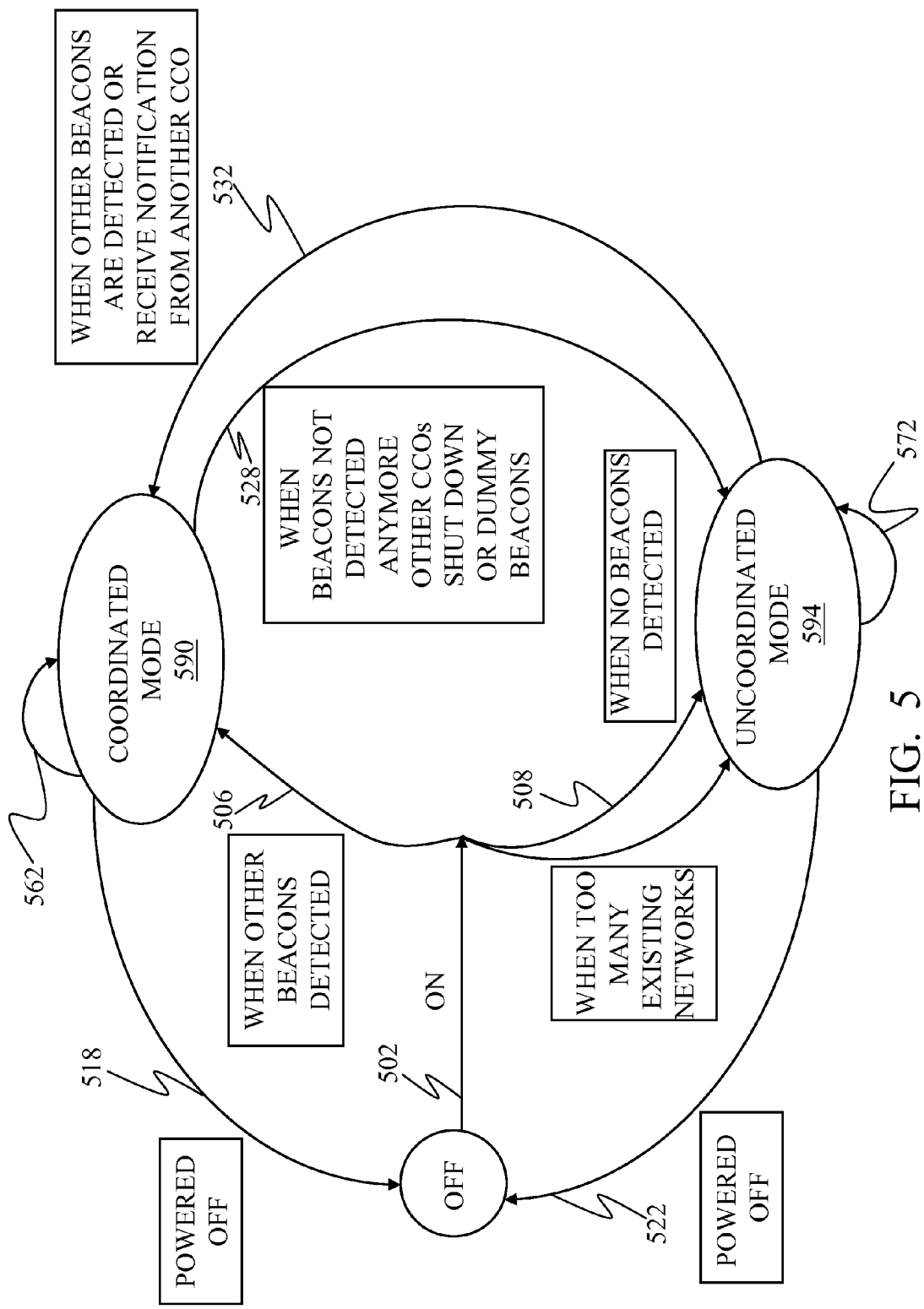
FIG. 5 is an exemplary transition diagram illustrating how a network may transition from a coordinated mode to an uncoordinated mode and vice versa, according to embodiments of the invention.

FIG. 4 shows exemplary beacons operating in one of the network operating modes; while FIG. 5 shows a transition diagram of network operating modes.

Neighbor Network Operating Modes—Uncoordinated Mode and Coordinated Mode:

A network typically operates in one of the following two modes—an uncoordinated (stand-alone) mode and a coordinated mode. In the uncoordinated mode, a new CCO typically establishes a new network in uncoordinated mode if it is unable to detect any beacons. This may happen either because there are no existing neighbor networks in the vicinity of the new CCO or because there are existing networks but the new CCO is not able to detect any of the beacons. In this mode, quality of service (QoS) may still be provided by allocating reserved or contention-free allocations or time slots to applications that may require QoS. In some embodiments, a threshold or conditions have to be satisfied before a CCO is able to say that beacons are detected, e.g., beacons have to be detected reliably, i.e., have to be detected a certain number of times within a certain time period or cycle. Thus, in some embodiments, if beacons are not detected satisfying a certain condition, the new CCO establishes a new network in uncoordinated mode. A CCO operating in uncoordinated mode, in some embodiments, generates its own timing and transmits its periodic beacon independently of other networks.

In the coordinated mode, a new CCO typically establishes a network in the coordinated mode if it is able to detect beacons typically reliably from at least one existing network. The new CCO may acquire the timing of the existing network and join the existing network to form a group. In the coordinated mode, a network may typically share bandwidth with neighboring networks in its INL, such that QoS may be provided within each network by using reserved or CFP regions.

In the coordinated mode, the regions of the beacon of a network are typically compatible with the regions of other networks in its INL. For example, if one network in the group, e.g., N1 284, specifies a reserved region and another network in its INL, e.g., N2 286, specifies a stayout region in the same interval, the two schedules are said to be compatible. On the other hand, if a network specifies a reserved region and a network in its INL specifies a CSMA region, they are said to be incompatible. Table I below shows the typical interaction between the different regions, typically when the CCOs are in the coordinated mode.

TABLE I

| Owner CCO | Neighbor CCO That Hears The Owner CCO And Is In The Same Group | Neighbor CCO That Hears The Owner CCO But Is In A Different Group |
| --- | --- | --- |
| Beacon | Beacon | Protected |
| Protected | Protected or Stayout | Beacon |
| Reserved/CFP | Stayout | Stayout |
| CSMA/CP | CSMA or Stayout | CSMA or Stayout |

FIG. 4 shows two exemplary beacons 460, 470 for two coordinating CCOs, for example, CCO1 202 and CCO5 272, respectively. The top beacon 460 and the bottom beacon 470 show an exemplary BW allocation and scheduling for network 1 284 and network 5 292, respectively. In this embodiment, N1 284, along with CCO1 202, and N5 292, along with CCO5 272, are functioning in the coordinated mode. To be compatible, when CCO1 schedules its beacon region 462, the neighbor network CCO5 also schedules its beacon region 472. Similarly, when CCO1 schedules a CSMA region 464 for channel contention, CCO5 also schedules a CSMA region 474 and a stayout region 482. In one embodiment, CCO5 may schedule an entire stayout region or CSMA region to correspond to the CSMA region 464. When CCO5 schedules a reserved region 476, CCO1 schedules a corresponding stayout region 466 so that the devices allocated reserved time slots 476 during those time intervals are able to transmit. Similarly, when CCO1 schedules a reserved region 468, CCO5 schedules a stayout region 478 to also guarantee, for example, QoS for network 1. In some embodiments, a minimum CSMA region (not shown) is allocated immediately following a beacon region.

FIG. 5 is a transition diagram illustrating how a network generally transitions between the typical two network operating modes—the coordinated mode 590 and uncoordinated mode 594. A new CCO that is powered on 502 and is unable to detect, e.g., reliably, any existing networks 508, starts operations in the uncoordinated mode 594. A CCO, however, that is able to reliably detect one or more beacons starts operating in the coordinated mode 506. In general, a CCO remains operating in its operating mode 562, 572, unless certain conditions 528, 532 trigger a CCO to transition to the other network mode. A CCO may also power off or leave the network or group 518, 522, as shown.

Transition to Uncoordinated Mode

A CCO typically functions in the coordinated mode 590 when it is able to decode other beacons reliably. If all the networks in the CCOs INL have shut down or if the CCO is no longer able to detect any other beacons for several beacon periods, typically, all in a row, the CCO assumes that the other networks have been powered off, and thus the CCO transitions 528 to the uncoordinated mode 594. The number of beacon periods determining whether a CCO may assume that all the other networks have been powered off may be predefined, user-defined, or dynamically defined within the system.

Transition to Coordinated Mode

A CCO typically functions in the uncoordinated mode 594 when it does not detect any other beacons. If that CCO receives a notification, such as a new CCO is confirming that a new network is going to be set-up or the CCO is now able to detect other beacons 532, the CCO then transitions from the uncoordinated mode 594 to the coordinated mode 590.

Another exemplary trigger for a transition from uncoordinated mode 594 to coordinated mode 590 is when the CCO receives a dummy beacon message from another CCO 528. A dummy beacon in general is used to coordinate between multiple beacon regions. This trigger generally occurs when coordination between networks from different groups are performed. This may happen, for example, when the new CCO establishes a new network in uncoordinated mode, because the new CCO is unable to detect any existing networks because of interference, and therefore did not specify a protected region to protect the beacon region of an existing network typically in a different group. When the existing network receives the new beacon from the new CCO, the existing network typically sends a dummy beacon message to announce its own existence. The new CCO may then transition to coordinated mode 590 and may also accordingly specify a protected region to protect the beacon region of the existing network in a different group.

Neighbor network coordination are further explained in the following pending applications with the following Ser. Nos. 11/089,792 entitled "Systems and Methods for Network Coordination with Limited Explicit Message Exchange," 11/089,756 entitled "Method for Transitioning between Coordination Modes for Interfering Neighbor Networks," and 11/089,882 entitled "Methods and Systems for Network Coordination." These pending applications are herein fully incorporated by reference.

AC Line Cycle Synchronization in Coordinated Mode

In one typical embodiment of the invention, the location of the beacon is synchronized with the AC line cycle. In this embodiment, performance and QoS stability in the presence of power line noise may be improved. Beacon periods may be synchronized with the underlying AC line cycle frequency, for example, with the 50 or 60 Hz AC line cycle. In one exemplary embodiment, when operating in power line environments with an AC line cycle frequency of 60 Hz, the beacon period may be set, for example, to 33.33 msec. On the other hand, a beacon period, for example, of 40 msec may be used when operating over 50 Hz AC line cycle. The above exemplary beacon periods correspond to typically twice the underlying AC line cycle period. In some embodiments, beacons may be synchronized with respect to the AC line cycle, for the uncoordinated mode, coordinated mode, or both.

In some embodiments, synchronizing beacon transmission to the line cycle enables better channel adaptation (e.g., tone maps)—for example, less adjustments. CCOs may phase lock the beacon transmission to the AC line cycle to provide synchronization for all stations in the network. Line-cycle synchronization may be achieved by having a CCO track a particular point in the AC line cycle, for example, from zero crossing, using in one embodiment, a detector, including a digital phase locked loop (DPLL) or equivalent. Thus, in one embodiment, a CCO may phase lock the beacon transmission to the AC line cycle to provide synchronization for all stations in the network.

A CCO may also use its local tracking history to also predict future locations of beacons and announce this to all stations in the beacon schedule, e.g., be able to announce the location of the beacon over the next few beacon periods. To ensure that stations with persistent allocations, i.e., valid for a certain number of periods, may transmit even when a beacon is not detected, a CCO may provide information about the location of future beacons within a beacon payload, for example.

In a group of coordination mode networks, the CCO in the smallest occupied beacon slot number typically tracks the AC line cycle and provides the beacon transmit offset information to other coordinating CCOs in that coordinating group. In some embodiments, the beacon transmit offset is fixed and is typically changed when the beacon is relocated. In some embodiments, the beacon period start time is synchronized to the AC line cycle. In some embodiments, the CCO may also set an AC line cycle synchronized flag in the beacon to indicate that it is locally tracking the AC line cycle. All other coordinating CCOs in the group thus may track a CCO that is reliably detected and that has the largest beacon slot number that is smaller than the beacon slot of the current CCO.

To ensure that the group of network operations does not get disrupted when a coordinating CCO shuts down, in one embodiment, a departing CCO may use an AC line synchronization ("synch") count down field, for example, that indicates the beacon period in which it stops transmitting the beacon. In one embodiment, the AC line sync count down field is used to indicate the number of beacon periods in which the AC line cycle synchronization of the current CCO is going to change.

If a new CCO joining a group of CCOs in coordinated mode determines that a beacon slot number smaller than the beacon slot of the CCO that is currently tracking the AC line cycle is not used, in some embodiments, the new CCO may request that smaller beacon slot number if the beacon of the CCO currently tracking the AC line cycle is detected, typically with some reliability threshold. In this embodiment, when the new CCO becomes part of the group and starts transmitting its beacons, the new CCO typically also initially tracks the AC line cycle information provided by the CCO transmitting the beacon in the larger beacon slot number and currently tracking the AC line cycle. Once a CCO that is tracking the AC line cycle determines the presence of a beacon in a smaller beacon slot number, it generally handovers or transfers the AC line cycle synchronization function to the CCO occupying the smaller beacon slot number by typically using the AC line sync count down field which indicates the number of beacon periods when that CCO is going to stop tracking the AC line cycle and when the other CCO is going to start tracking the AC line cycle.

In another embodiment, the beacon structure typically of a group may be relocated to a different part of the AC line cycle. This relocation may in one embodiment be performed by having a relocation count down field that indicates the number of beacon periods after which the beacon relocation may occur. Another field that may be used in conjunction with the relocation count down field is a relocation offset field (RLO). In some embodiments, an RLO field is a field that indicates the offset of the new beacon location from the current beacon location. In some embodiments, the RLO field is defined in multiples of 0.32 msec. Typically, the relocated beacon is delayed in time relative to the old beacon location.

Figure 6:
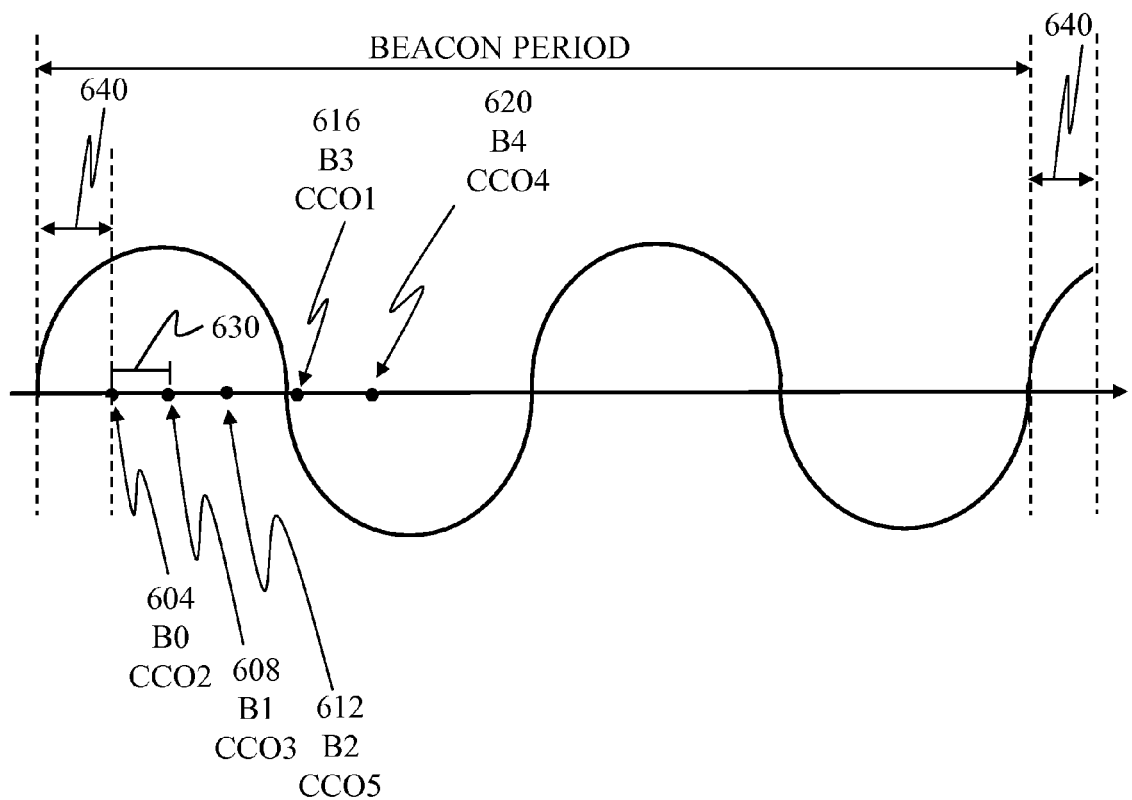
FIG. 6 shows exemplary beacons synchronized to an exemplary alternating current (AC) line cycle according to an embodiment of the invention.

FIG. 6 is an exemplary AC line cycle illustrating how the beacon slots may be synchronized. In the following example, refer collectively to FIGS. 2, 3A, and 6, with the group 200 of five exemplary networks N1 284, N2 286, N3 288, N4 290, and N5 292 where all are functioning in the coordinated mode and each is assigned its own beacon slot to transmit its beacon. Beacon slots B0 312, B1 314, B2 316, B3 320, and B4 324 are assigned to CCO2 222, CCO3 242, CCO5 272, CCO1 202, and CCO4 262, respectively. CCO2 222 accordingly occupies the smallest beacon slot number, B0 312, and transmits, at an offset 640 from a point in the AC line cycle, e.g., the zero crossing, at B0 604. In some embodiments, the beacon transmit offset is zero, meaning that the smallest beacon slot is transmitted at the zero crossing. The next CCO, CCO3 242, occupying the next occupied time slot, B1 608, for example, then transmits at a delayed time from B0 604, typically delayed by a duration 630 equal to the size of the beacon slot and the beacon interframe space, if any. The timing of CCO2, occupying the first or lowest occupied or allocated beacon slot number—B0 604, thus is a master beacon slot that functions as a master timing sequence, synchronizing when the other coordinating CCOs are to transmit their respective beacons.

Typically, a CCO bases its timing on a beacon that it is able to detect. In some embodiments, a CCO, e.g., CCO3, tracks the timing of the largest beacon slot number, which it is able to detect that it is smaller than the beacon slot of CCO3, in this case, B0 604, i.e., CCO2. CCO 5 in turn bases its beacon transmission from the beacon that CCO5 is able to detect which has the largest beacon slot number that is smaller than the beacon slot of CCO5, i.e., bases its timing from B0 604, i.e., CCO2 In this exemplary embodiment, CCO5 is able to detect the beacons transmitted by CCO1 but not those transmitted by CCO3. CCO 5 transmits at B2 612 after a time delay. CCO1 then bases its beacon transmission 616 from B2 612, i.e., CCO5, and CCO4 bases its beacon transmission 620 from B1 608, i.e., CCO3. The beacon period is thus synchronized to the AC line cycle thereby synchronizing also the neighbor networks in general.

The beacon slot B0 thus functions as a master slot that defines a master timing sequence from which the other beacon slots base their timing. In some exemplary embodiments, the transmission of the other beacon slots is based on the master slot and, optionally, one or more offsets. The delayed time duration may in one embodiment be presented as an offset from the previous beacon slot being tracked. In an alternative embodiment, a fixed constant of time is used to define the delay. In one embodiment, a data structure containing offset values from one beacon to another is stored and maintained by one or all of the CCOs. In another embodiment, the offset is defined as a beacon transmission offset field, which may contain a signed 16-bit value measured in units of the CCO clock period, e.g., based on the CCO's 25 MHz clock. In another embodiment, such offset field is defined as a multiple of a certain time period, e.g., multiples of 0.32 μsecs. In another embodiment, offset of future beacons from their expected location, e.g., for relocation, may also be maintained and announced within the system. In another embodiment, a bit mask or map, e.g., called slot usage, is used to keep track of occupied/allocated beacon slots, such that bits that are set to "1" indicate beacon slots that are used by CCOs and bits that are set to "0" indicate unoccupied beacon or time slots. Various other software engineering techniques, such as to store AC line information, may be used as known to those to those of ordinary skill in the art.

Figure 7:
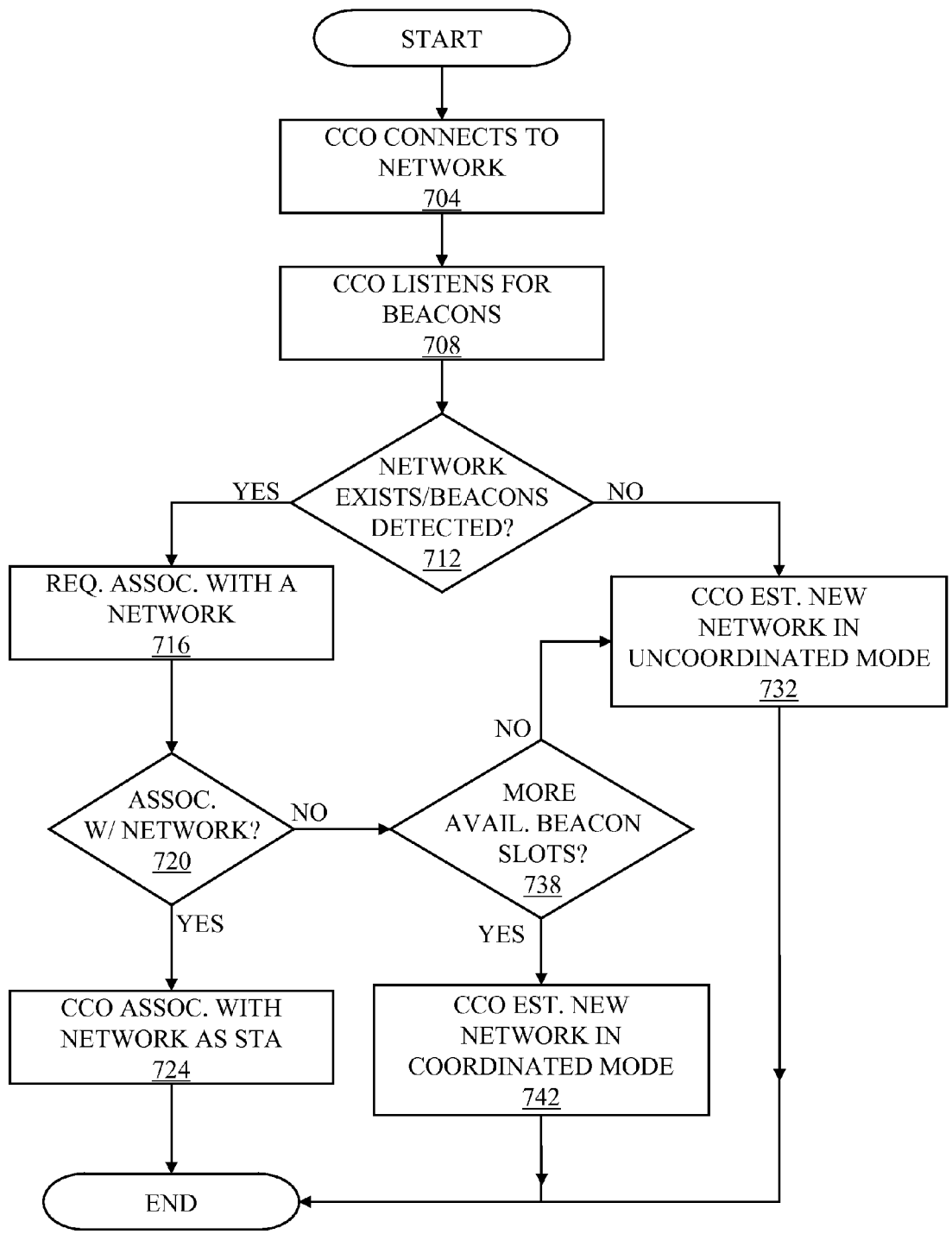
FIG. 7 is a high-level exemplary flowchart showing how a network operating mode may be determined according to an embodiment of the invention.

FIG. 7 is a high-level exemplary flowchart illustrating a process by which a CCO may determine its network operating mode. Typically, only a CCO (or a STA that is CCO-capable) is able to establish a network. Thus, if a STA, that is a non-CCO-capable device, joins a group, it generally joins as one of the stations in a network and is controlled by a CCO. The STA's function as a station includes decoding and following beacon schedules rather than generating and transmitting beacons to control the network. The exemplary flowchart of FIG. 7 accordingly illustrates a CCO-capable STA/CCO determining its network operating mode.

In the first operation, a CCO connects with the communication or transmission medium, for example, plugging the CCO device into an electric outlet and powering it up (step 704). When the CCO is connected to the medium, it listens for beacons (step 708). If no networks exist or no beacons are detected (step 712), the CCO establishes a new network in uncoordinated mode (step 732). If networks, however, already exist, meaning that beacons from networks are heard (step 712), the CCO then requests association with one of the networks (step 716). In one embodiment, not shown, if more than one group exists, the CCO first decides which group to associate or join. In general, the CCO associates with typically one network but may request association from some or all the networks that the CCO hears, until it is accepted by one of the networks. If the CCO is able to associate with one of the networks (step 720), that CCO becomes part of that network and is typically associated as a station, rather than as a CCO (step 724). This means that the CCO in that network functions as a STA controlled by the CCO already controlling that network. The CCO/STA, however, may be designated as a backup or auxiliary CCO, if appropriate. In one embodiment, a CCO creates a new network or neighbor network only if it fails to associate with existing networks, for example, in situations where the CCO does not possess the network password, for example.

If the CCO, however, is not able to associate with any of the existing networks, the CCO determines if there are available beacon slots (step 738) so as to establish a new neighbor network in the coordinated mode within the group. In a typical embodiment, this may be determined by decoding beacons and determining vacant beacon slots. If there is an available beacon slot for that CCO to use to transmit its own beacon in the group, the CCO establishes a new network in the coordinated mode and joins the group (step 742). On the other hand, if the beacon region has all available beacon slots allocated for other CCOs, the CCO establishes a new network in the uncoordinated mode (step 732). In some embodiments, the CCO in the uncoordinated mode detects the beacon of other networks and determines, for example, an idle interval using CSMA and starts transmitting its beacons in that interval once every beacon period. In some embodiments, the CCO in the uncoordinated mode may maintain its own timing and decide its schedules independently, and thus be in a different group. In another embodiment, the beacon period timing of the uncoordinated mode is different from the beacon period timing of those CCOs operating in the coordinated mode typically so as to avoid collision with the CCOs operating in the coordinated mode. As shown in FIG. 5, a CCO or network may transition from uncoordinated mode to coordinated mode and vice versa.

Establishing a New Network in Coordinated Mode

In one exemplary embodiment, in order to establish a new network in a coordinated mode, the CCO, i.e., a new CCO, typically assigns a short network identifier (SNID) to identify itself, finds a vacant beacon time slot in the beacon region to use, and specifies a beacon period structure that is compatible with all the networks that are in its INL.

Determining the Interfering Network List and Choosing an SNID.

The new CCO first requests the INL of the neighbor CCOs. This step enables the new CCO to ascertain the SNID and network identifier (NID) of the interfering networks of the neighbor CCOs. The new CCO may then randomly choose a SNID value, which is not used by any of its neighbor CCOs or by any interfering networks of its neighbor network CCOs. The manner in which the SNID is assigned, however, may be varied, for example, choosing a SNID from a table or generalism of random SNIDs. Table II below shows an exemplary message, including exemplary fields that may be included in a message that may be used by a CCO to request the INL of another CCO. This message is typically sent unencrypted.

TABLE II

Exemplary Request for Interfering Network List (e.g., NN_INL.REQ)

| Field | Brief, Exemplary Definition |
| --- | --- |
| MyTEI | TEI of the sender of this message. |
| MySNID | SNID of the sender of this message. |
| MyNID | NID of the sender of this message. |
| MyNumSlots | Number of Beacon slots in the Beacon Region of the sender of this message. |
| MySlotID | SlotID where the sender of this message transmits its Beacon |
| NumInfo | Number of network information to follow (=N) |

TABLE II-continued

Exemplary Request for Interfering Network List (e.g., NN_INL.REQ)

| Field | Brief, Exemplary Definition |
|---|---|
| SNID_1 | SNID of the first network that the sender can detect. |
| NID_1 | NID of the first network that the sender can detect. |
| NumSlots_1 | Number of Beacon slots in the Beacon Region of the first network that the sender can detect. |
| SlotID_1 | SlotID where the first network that the sender can detect transmits its Beacon. |
| Offset_1 | Offset between the Beacon Regions of the sender of this message and the first network that it can detect, measured in units of AllocationTimeUnit, e.g., 10.24 μsec. Offset = e.g., start time of sender's Beacon Region minus start time of receiver's Beacon Region (modulo) Beacon Period. |
| ... | ... |
| SNID_N | SNID of the last network that the sender can detect. |
| NID_N | NID of the last network that the sender can detect. |
| NumSlots_N | Number of Beacon slots in the Beacon Region of the last network that the sender can detect. |
| SlotID_N | SlotID where the last network that the sender can detect transmits its Beacon. |
| Offset_N | Offset between the Beacon Regions of the sender of this message and the last network that it can detect, measured in units of AllocationTimeUnit. |

Finding a Vacant Beacon Slot.

CCOs generally broadcast time-slot scheduling using beacons. To determine a vacant beacon time slot, the new CCO decodes existing or broadcasted beacons to determine the beacon region structure of each network in its INL, which is typically also the group that the CCO chooses to join. Moreover, the CCO determines a common beacon slot indicated as available or "free," by all networks. If a vacant common beacon slot cannot be found, the new CCO may propose to use a new beacon slot, typically subject to the maximum limit of the number of maximum beacon slots available in a beacon region.

Specifying a Compatible Beacon Period Structure.

After determining the SNID and a common vacant beacon slot, the new CCO then typically sends to all neighbor CCOs in its INL, a request to set-up a new network or CN, using the SNID and the determined or proposed beacon slot time. In one embodiment, this request is sent unencrypted and in a CSMA region of the neighbor CCO. If the request is granted by a neighbor CCO, that neighbor CCO also sends its beacon period structure or schedule to the new CCO. If one neighbor CCO rejects the request to start a new network/CN, the request is cancelled for all neighbor CCOs. Assuming, however, that all of them accepted or granted the request, the new CCO, typically basing on all the schedules received from the various neighbor CCOs, determines a compatible beacon period structure for it to use as a CCO of a new CN. This determining step typically enables the channel, particularly the bandwidth, to be shared between the new centralized network and the existing neighbor networks.

In some embodiments, if the proposed beacon slot is not available or does not exist, the neighbor CCOs in the group typically increase the size of their beacon region, including the number of beacon slots. The change in the number of beacon slots is typically broadcasted via one or more beacons. Each neighbor CCO in the same group may also implicitly or expressly request neighbor CCOs in a different group to appropriately increase the duration of their protected region or create a new protected region, assuming group coordination is performed.

Determining a Compatible Beacon Schedule

Uncoordinated Mode: In one embodiment, a new CCO may establish a new network in uncoordinated mode. This new CCO typically specifies a beacon region with one beacon slot and a CSMA region for the remaining of the beacon period. In one embodiment, if it cannot detect other beacons, it may optionally establish one or more CFP or reserved regions.

Coordinated Mode: Alternatively, if the new CCO joins an existing group of networks in coordinated mode, the new CCO schedules its beacon such that it is compatible with the schedules of the existing networks in its INL. Typically, the CCO determines the INL and the INL allocation. Based on the INL allocation, a compatible schedule is set-up. To determine the INL allocation, a CCO typically decodes the beacons of all the networks in its INL and computes or determines the combined effect of their allocations, i.e., the INL allocation. For example, if one neighbor network in the INL specifies a reserved region and another neighbor specifies a CSMA or stayout region, the resultant INL allocation is a reserved region, because a reserved region "outweighs" both CSMA and stayout regions. In another example, if three networks have three different region types in the same time interval allocation, e.g., reserved region, CSMA region, and stayout region, the determined INL allocation is the reserved region, because the reserved region outweighs both the CSMA and the stayout regions. In general, the INL allocation is assigned the same region type of the network whose region type is highest in an exemplary hierarchy. Table III below in general shows an exemplary hierarchy of the various regions of a beacon period.

TABLE III

Hierarchy of Regions

| Level of Weight (5 = Most Weight, 1 = Least Weight) | Region Type |
|---|---|
| 5 | Beacon Region |
| 4 | Protected Region (generally, present if coordinating between groups) |
| 3 | Reserved or CFP Region |
| 2 | CSMA or CF Region |
| 1 | Stayout Region |

In a typical embodiment, the start and/or end time of each region is also generally maintained or kept track of by the various CCOs, so that an appropriate compatible schedule and INL allocation may be determined, particularly when regions are of varying sizes or allocations and/or if there are differences in system timing.

Table IV below shows exemplary results of INL allocation based on the hierarchy shown in Table III. In this exemplary table, there are two neighboring networks, Network 1 and Network 2.

TABLE IV

Exemplary INL Allocation

| Region Type of Network 1 | Region Type of Neighbor 2 | INL Allocation of Networks 1 and 2 |
|---|---|---|
| Beacon | Beacon, Protected, Reserved, CSMA or Stayout | Beacon |
| Protected | Beacon | Beacon |
| Protected | Protected, Reserved, CSMA, or Stayout | Protected |

TABLE IV-continued

Exemplary INL Allocation

| Region Type of Network 1 | Region Type of Neighbor 2 | INL Allocation of Networks 1 and 2 |
|---|---|---|
| Region Type of Network 1 | Region Type of Neighbor 2 | INL Allocation of Networks 1 and 2 |
| Reserved | Beacon | Beacon |
| Reserved | Reserved, CSMA, or Stayout | Reserved |
| CSMA | Protected | Protected |
| CSMA | CSMA or Stayout | CSMA |
| Stayout | CSMA | CSMA |
| Stayout | Stayout | Stayout |

Once the INL allocation is determined, the CCO typically complies with the conditions outlined below, to be compatible. (See FIG. 4, for example, for compatible beacon schedules.) Initially, the new CCO does not specify any reserved regions.

i.) If the INL allocation is a beacon region and is the first entry in the beacon period, the new CCO typically specifies a beacon region. However, if it is not the first entry, the new CCO typically specifies a protected region, where the coordination between groups of network is in effect. In some embodiments, there is typically only one beacon region within a beacon.

ii.) Otherwise, if the INL allocation is a protected region or a reserved region, the new CCO specifies a stayout region.

iii.) Otherwise, the new CCO specifies a CSMA region in all other intervals.

Once a network is established in coordinated mode, the conditions typically used by an existing CCO to set the subsequent region types are as follows:

i.) If the INL allocation is a beacon region and if it is the first entry, the existing CCO specifies a beacon region. However, if it is not the first entry, the existing CCO specifies a protected region, where the coordination between groups of network is in effect.

ii.) If the INL allocation is a protected region or a reserved region, the existing CCO specifies a stayout region.

iii.) If the INL allocation is a CSMA region, the existing CCO specifies a CSMA region.

iv.) If the INL allocation is a stayout region, the existing CCO may specify a CSMA region or a reserved Region.

New Network Instantiation amid Two Groups of Networks

Figure 8:
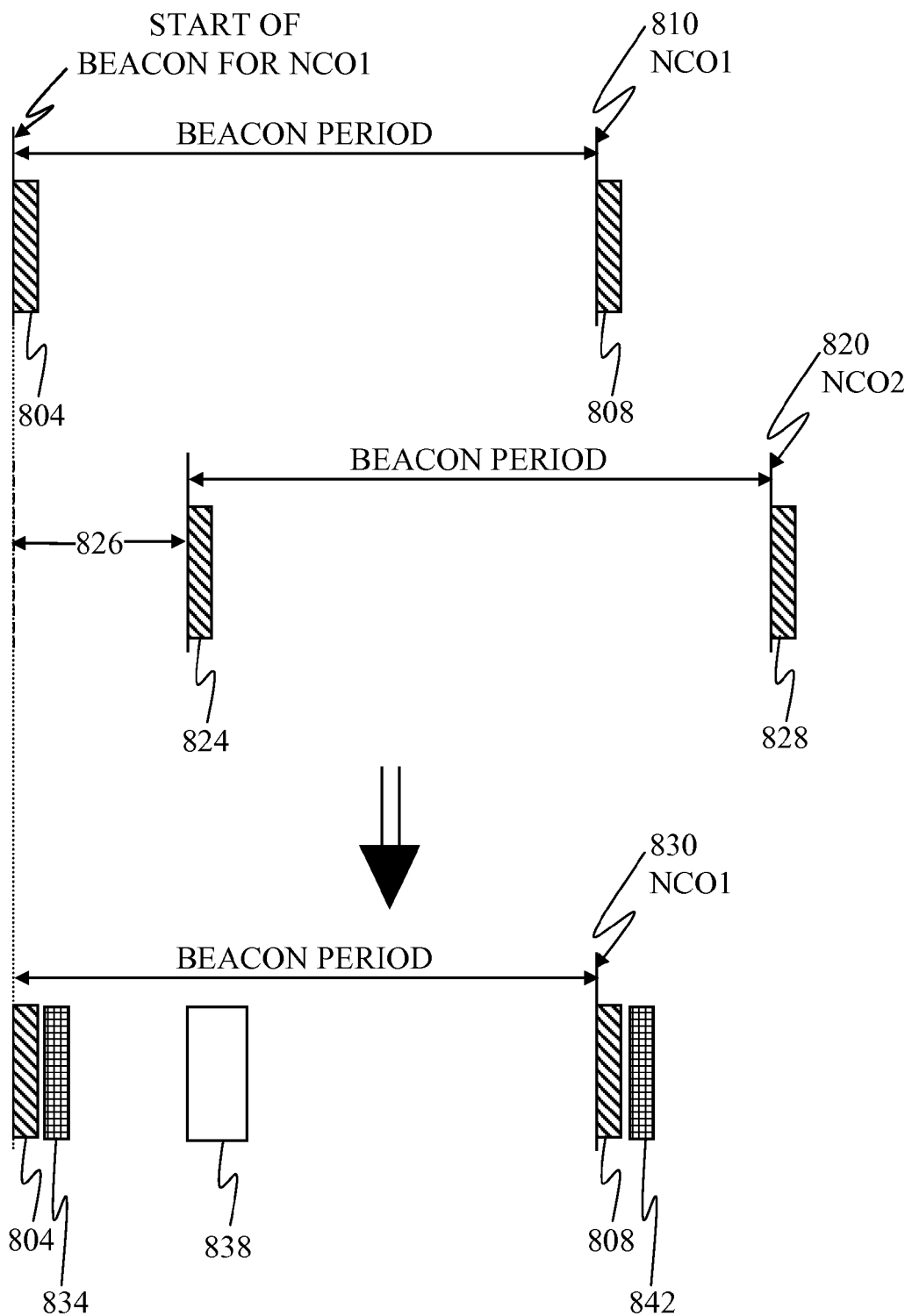
FIG. 8 shows exemplary beacons of two coordinating networks according to an embodiment of the invention.

FIG. 8 shows exemplary beacons 810, 820, 830, particularly their beacon regions or portions thereof. A new CCO may detect two or more groups of networks in the vicinity of each other. In this exemplary embodiment, two existing networks, NCO1 810 and NCO2 820, are unable to detect each other's beacons, and there is a fixed time offset 826 between their beacon period boundaries. The new CCO, however, is able to detect and decode the beacons from both NCO1 and NCO2. The top beacon 810 shows the beacon structure of NCO1 and typically also its group. In this beacon, NCO1 transmits its beacon at beacon slot #0 804, e.g., SLOTID=0; Network NCO1, particularly its CCO, transmits its next beacon at the next beacon slot #0 808, i.e., at the next beacon period. The second beacon 820 shows the beacon structure of NCO2 and typically also its group. NCO2 transmits at slot #0 824. The next beacon transmission is at the next beacon period slot #0 828.

Considering that the timings of the two existing networks are different—two different groups, the new CCO typically acquires the timing of one of the groups. If the new CCO chooses the same timing as NCO1, meaning joins NCO1's group, the new CCO typically exchanges messages with NCO1, particularly messages requesting to create a new network in the coordinated mode, including a new beacon slot allocation, e.g., SLOT #1, for the new CCO. In this embodiment, the new network established by the new CCO and the network of NCO2, however, may interfere with each other because they do not coordinate with each other.

In another exemplary embodiment, to coordinate with another group with a different timing, the new CCO may optionally exchange the request to create a new network with NCO2, in addition to the request to NCO1. The request to NCO2, in one embodiment includes an offset field, e.g., offset 826, which may be set to a non-zero value to indicate that the new CCO has a different system timing than NCO2. This offset field may contain the time offset between the beacon regions of the sender and the receiver, typically in units of a defined allocation time unit. If NCO2 accepts the request of the new CCO, all three networks may coordinate with each other. In this embodiment, the new CCO may specify a protected region 838 in the same interval where NCO2 has specified a beacon region for that NCO2 group.

The bottom beacon 830 shows an exemplary beacon structure, after the new CCO joins NCO 1's group in the coordinated mode and with group coordination. The new CCO is allocated a beacon slot, e.g., slot #1 834, at which the new CCO may transmit its beacon. The next beacon transmission for the new CCO is typically in the same slot number 842, slot #1, for example.

FIGS. 9A, 9B, 9C, and 9D show exemplary beacons according to embodiments of the invention. In this exemplary embodiment, FIG. 9A, network A initially operates in the uncoordinated mode. The exemplary beacon structure or portion thereof of network A before network B joins the group, is shown at the top beacon 902. This beacon 902 indicates that CCO A transmits its beacon at slot #0 904 and that there is only one beacon slot in the beacon region.

Figure 9A:
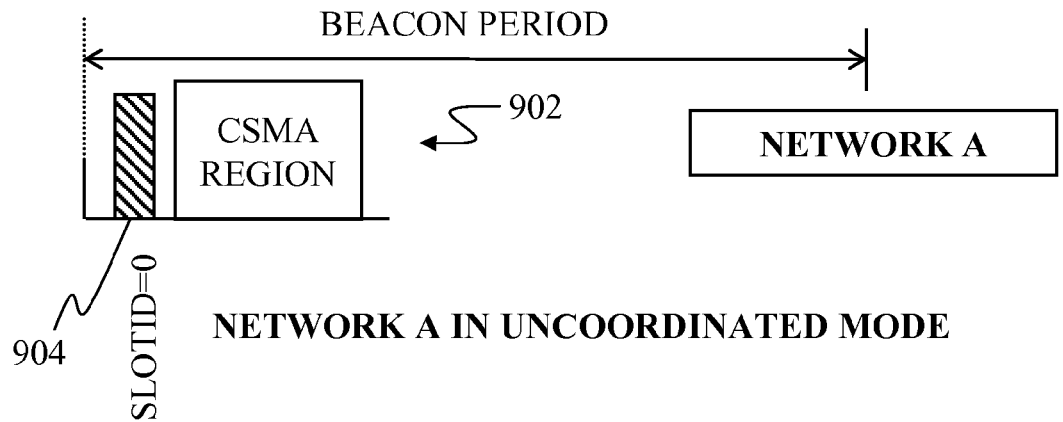
FIGS. 9A, 9B, 9C, and 9D show exemplary beacons according to embodiments of the invention.
Figure 9B:
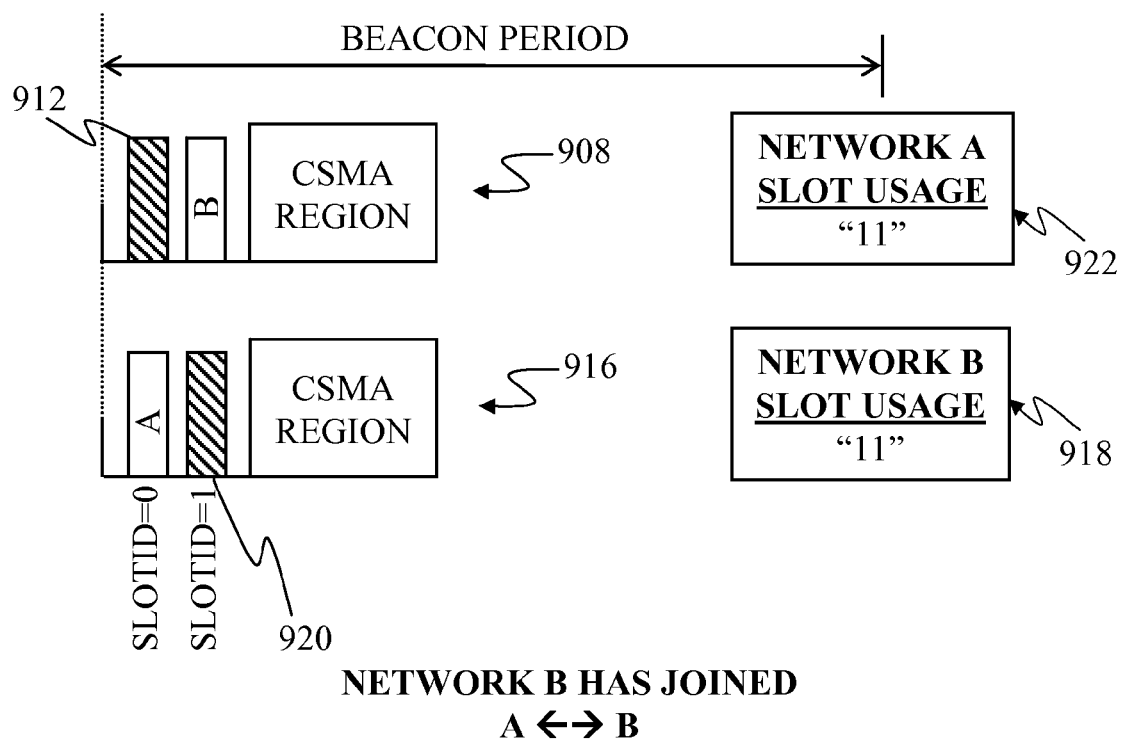

For illustrative purposes, CCO B wants to join network A and to establish a new network, FIG. 9B. CCO B typically performs this function by sending a request to establish a new network to CCO A. This request, e.g., called NN_NEW_NET.REQ in this example, is typically a message sent by a new CCO to the CCOs in its INL to request to set up a new network. This request to establish a new network may contain a proposed beacon slot number, a proposed number of beacon slots, and a time offset between the beacon region of the sender and the receiver. In some embodiments, a field, for example, an offset field is set to zeros indicating that the message/request is sent by a CCO of the same group, i.e., with the same system timing. Otherwise, the offset field may be defined as the start time of the beacon region of the sender minus the start time of the beacon region of the receiver. In one embodiment, the message is sent unencrypted. When CCO A receives this request to establish a new network from CCO B, CCO A typically increases its beacon slot by one and typically sends a confirming response message, e.g., called NN_NEW_NET.RSP in this example, to CCO B indicating success, if appropriate.

After receiving the NN_NEW_NET.RSP message indicating success, for example, CCO B may then send another message, e.g., called NN_NEW_NET.CNF in this example, to CCO A to confirm the establishment of the new network in coordinated mode. An exemplary NN_NEW_NET.CNF message, in one embodiment, is sent by a new CCO, typically the CCO that also sent the NN_NEW_NET.REQ message, to the CCOs in its INL to confirm whether the request to establish a new network is going to proceed or be canceled. The beacon structures of network A 908 and network B 916, after network B joins the group, in this example show that the beacon regions of both network A 908 and network B 916 contain two slots, beacon slot #0 912 allocated for network A beacon transmission and slot #1 920 allocated for network B.

Slot Usage

In some embodiments, a slot usage field 918, 922 is an 8-bit bit mask or bit-map. Each bit typically corresponds to a slot number, and a "1" in that bit indicates that the slot is occupied or allocated while a "0" indicates not used or unallocated. Other software engineering techniques as known to those of ordinary skill in the art may be used to indicate slot usage, such as having an array of fields.

In some embodiments, a CCO in coordinated mode typically sets the slot usage field according to the following exemplary rules:
 (a) Set to "1" the bit corresponding to the beacon slot where the CCO transmits its own beacon;
 (b) Set to "1" the bit corresponding to the beacon slot where beacons of a network, of the same group, in the CCOs INL are detected; and
 (c) Set the remaining bits to "1" if the same bit is set to "1" in one or more beacons of a network in the CCOs INL, except if the CCO has received a message indicating that such bit is to be set to "0."

Figure 9C:
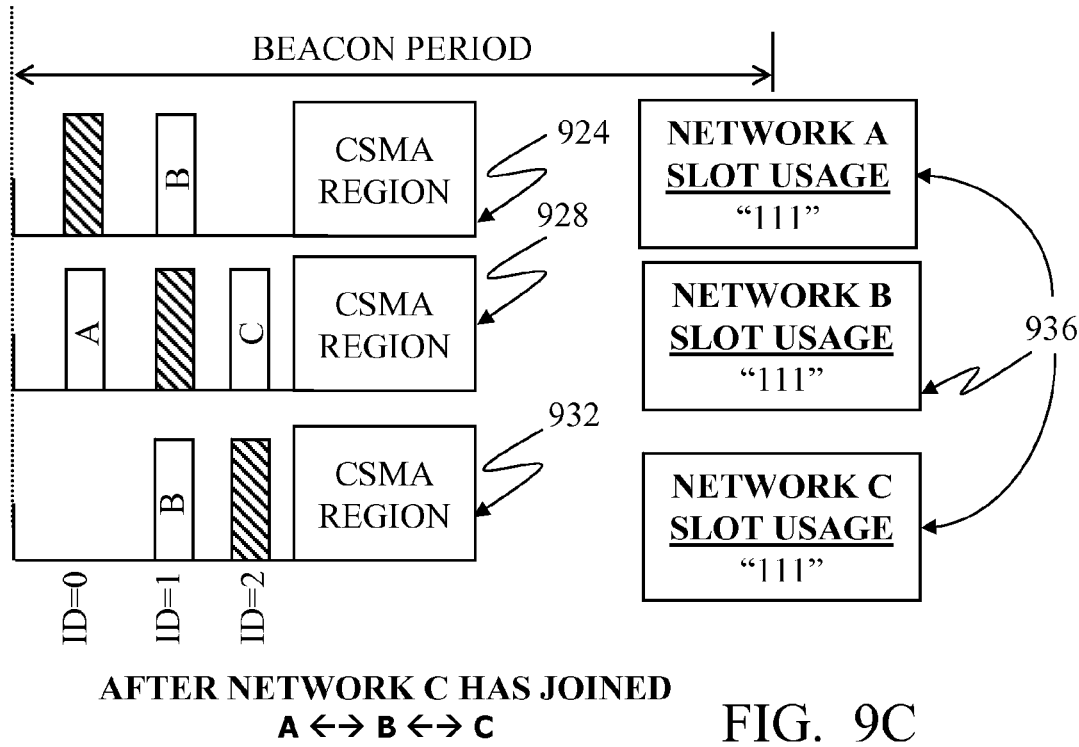

Referring to FIG. 9C for further illustration, by example, should another new CCO, CCO C, decide to establish a new neighbor network within the same group of networks A and B. In this embodiment, CCO C is able to decode beacons from network B but is unable to decode beacons from network A. The beacon of network B, for example, its slot usage field, 918 (FIG. 9B) indicates that the first two beacon slots are occupied. In this example, CCO C sends an NN_NEW_NET.REQ message to CCO B requesting to use a new beacon slot, e.g., the third slot in the beacon region, i.e. slot ID=2 or slot #2. When CCO B receives this message, it typically first coordinates with the networks in its INL, i.e., network A, to increase the size of the beacon region. To do this, CCO B typically sends a message to CCO A, e.g., NN_CHG_BR.REQ, to request that the number of beacon slots be increased to three. CCO A then replies to CCO B with a message containing a successful result code. In one embodiment, if CCO A and CCO B are in different groups, the NN_CHG_BR.REQ message may implicitly or expressly request CCO A to change the duration of its protected region. When CCO B receives the reply from CCO A, it sends an NN_NEW_NET.RSP message to CCO C to accept its request to start the new neighbor network.

Continuing with this example, CCO C then sends an NN_NEW_NET.CNF message to CCO B to confirm the establishment of a new network. The three beacons 924, 928, 932 (FIG. 9C) show the beacon regions of network A, network B, and network C. The slot usage fields 936 are updated to indicate that all three beacon slots are occupied, even though CCO C is not able to detect the beacons of network A in slot ID=0. In this exemplary embodiment, networks A, B, and C are functioning in the coordinated mode.

Figure 9D:
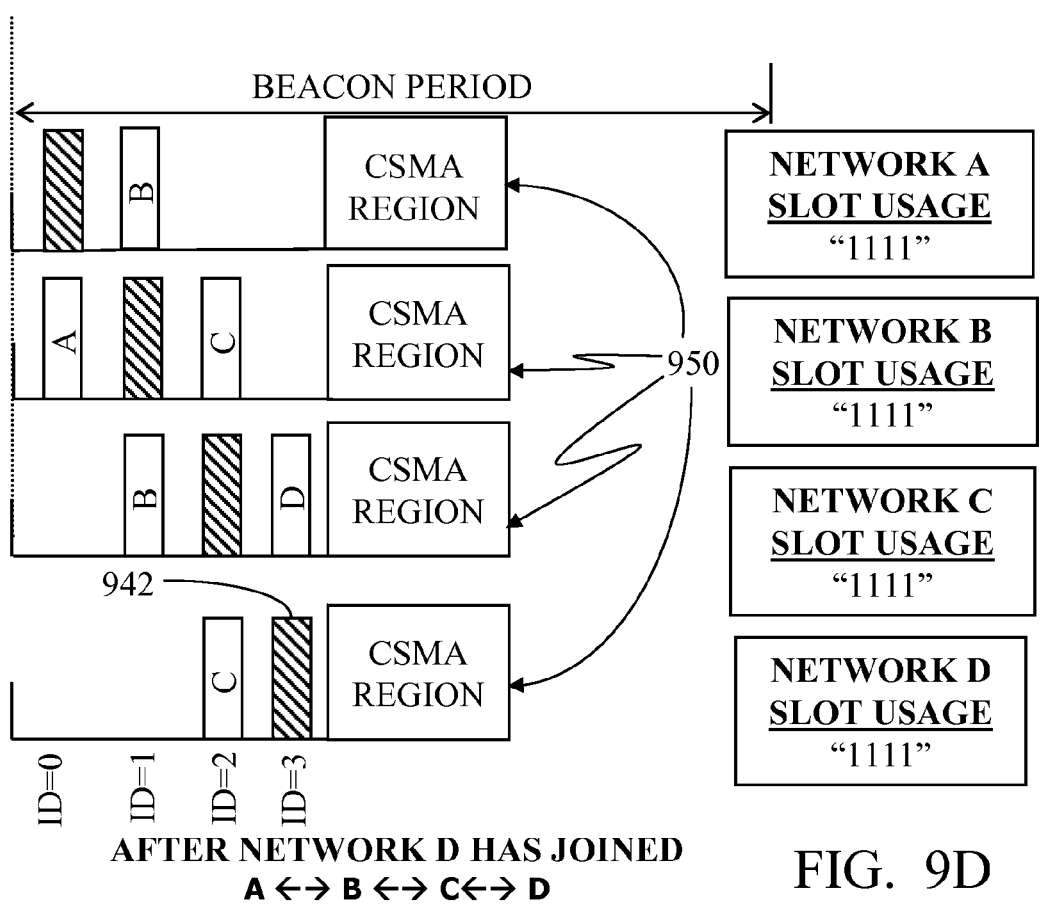

A new CCO, CCO D, may then decide to start a new neighbor network (FIG. 9D). CCO D, in this example, is only able to decode beacons from network C. The beacon slot usage field of network C, at this point, indicates that the first three beacon slots are occupied—"111." CCO D accordingly sends an NN_NEW_NET.REQ message to CCO C requesting to use Slot ID=3, which is the fourth slot in the beacon region 942. When CCO C receives the message, it first typically coordinates with the networks in its INL, i.e., network B to increase the beacon region size. CCO C may then send an NN_CHG_BR.REQ message to CCO B requesting to increase the number of beacon slots to four. CCO B then typically first exchanges NN_CHG_BR.REQ/RSP messages with CCO A and then sends an NN_CHG_BR.RSP message to CCO C.

CCO C then replies with an NN_NEW_NET.RSP message, for example, accepting the request of CCO D. CCO D then typically sends an NN_NEW_NET.CNF message to CCO C confirming the establishment of the new network. The four bottom beacons 950 show the beacon region of each network after network D has established a new neighbor network.

A CCO of the present invention typically is able to share bandwidth between neighbor networks. In general, a CCO, for example, may request additional bandwidth with neighbor networks in a coordinated mode. The CCO may do so by sending a request, to the various CCOs of the neighbor networks, indicating the time slots that the CCO wants to reserve. If the request is granted by all neighbor CCOs, the requesting CCO accordingly changes its beacon structure, for example, allocating those requested time slots to a CFP. To be compatible, however, the neighbor CCOs modify their time slots to a stayout region.

Figure 10:
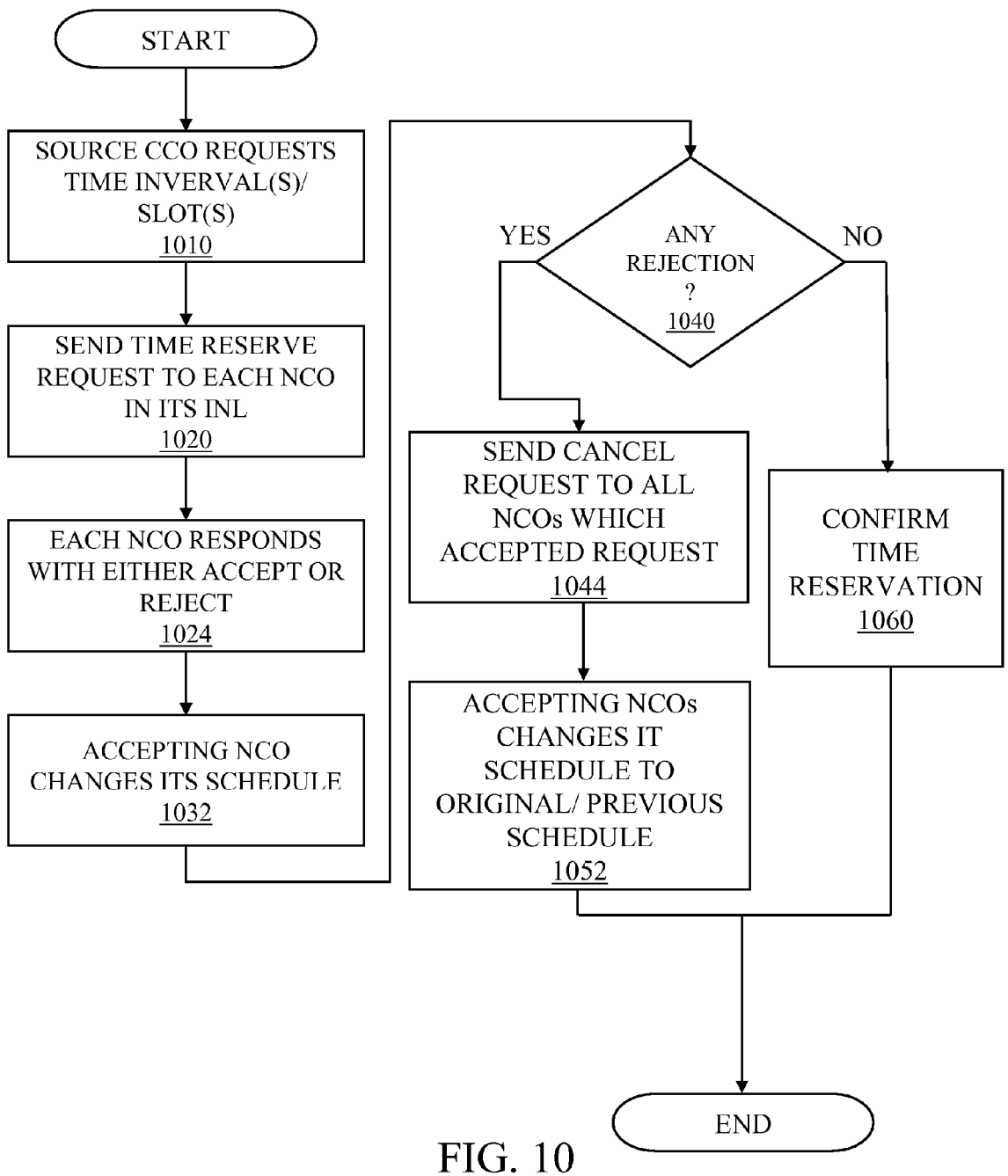
FIG. 10 is a high-level exemplary flowchart showing how a new network may be established according to an embodiment of the invention.

Sharing Bandwidth in Coordinated Mode:

FIG. 10 is a high level exemplary flowchart showing one embodiment of a process by which bandwidth is shared between CCOs, particularly between neighbor networks operating in the coordinated mode. In this example, the source CCO initially determines one or more new time intervals that it desires to reserve, i.e., to reserve as a reserved region or CFP region (step 1010). In general, the source CCO derives or selects a schedule compatible with its other neighbor networks in its INL. The source CCO then sends a message/request to each of its neighbor networks in its INL indicating the requested additional time interval(s). In some embodiments, the schedule for each requested interval is specified by a start time and an end time, typically using the start time of the sender's beacon region as a reference (step 1020). Each of the neighbor networks in general, particularly its CCO, responds to that request by either accepting or rejecting that request (step 1024). If the neighbor network accepts that request, the neighbor central coordinator (NCO) typically changes its one or more regions to reflect the changes in its schedule (step 1032). Such change may, for example, include changing one or more time slots to a stayout period. If the neighbor network rejects that request, the neighbor network notifies the source CCO, typically with an unsuccessful result code, i.e., a rejection (step 1024).

When the source CCO receives the response from all of its neighbor networks (NCOs) in its INL, it generally determines whether any rejection responses have been received. If all the NCOs accepted the requested time interval (step 1040), the CCO updates a status field message, e.g., with a "Go," and sends out a confirming message to all of its neighbor networks in its INL and confirms that the source CCO is going to reserve the requested time interval (step 1060). On the other hand, if any one of the NCOs rejected the request, (step 1040) the source CCO updates the status field to a "Cancel," informs the NCOs that the request has been cancelled or withdrawn. In some embodiments, the CCO typically sends this "Cancel" message only to those NCOs that have previously replied with successful result code or acceptance of the request. Upon receiving the "Cancel" message, particularly these NCOs that previously changed their regions reset their schedules to their original values (step 1052).

Releasing Bandwidth

A CCO that wishes to release one or more reserved time intervals, e.g., one or more time slots in one or more reserved regions, typically sends a release reserved time interval message to each neighbor CCO in its INL. This release message typically contains the schedules to be released. The schedule is typically specified by a start and end time, for example, using the CCOs beacon region as a reference. Each CCO that receives this request typically sends a response back, e.g., a response indicating success or failure. If a response indicating "success" is received, this means that the requesting CCO may change its previously indicated reserved region to CSMA, for example, while the CCO in the INL may change its previous stayout region also to CSMA.

Shutting Down in Coordinated Mode

A CCO, e.g., called CCO SD, may inform or send a shut-down message, e.g., called in this example NN_REL_NET-.IND, to the various neighbor networks in its INL. This shut-down message typically specifies the beacon slot being used by the CCO SD and the reserved regions allocated to the CCO SD available that may now be released for use by neighbor CCOs or by new CCOs. A CCO that receives this shut-down message typically sends a slot usage update message, e.g., called NN_UPD_SLOTUSAGE.IND, to each CCO in its INL requesting it to set the appropriate bit in the slot usage field to "0."

The CCOs in the INL that receive this NN_UPD_SLO-TUSAGE.IND typically update their slot usage fields by changing the appropriate beacon slot to "0," for example, and in turn also sends an NN_UPD_SLOTUSAGE.IND message to each NCO in its own INL that is in the same group and, typically, whose network ID is not the same as the network ID of the CCO which received the original shut-down message.

In some embodiments, if the last beacon slot in the beacon region has been unoccupied for a period longer than a specified idle beacon slot timeout, a CCO may request to reduce the number of beacon slots. In one embodiment, if a network operating in the coordinated mode shuts down, it may use an AC line sync count down field to indicate the beacon period within which it may stop transmitting. This may enable other coordinating CCOs that are tracking the AC line cycle information provided by this departing CCO to recover appropriately, for example, CCOs tracking the AC line cycle information provided by departing CCO may either choose a different CCO to track, if one is available, or start tracking the AC Line cycle.

Detect-and-Report Procedure

The detect-and-report procedure is a process that enables a CCO to determine whether a STA, particularly in its centralized network, is within the reception range of any ongoing transmissions. The CCO initiates this procedure by requesting a STA to detect for ongoing transmissions in some specified time intervals for a specified duration, i.e., when to listen and for how long. In some embodiments, the duration is defined in beacon periods. That STA then listens and detects for any transmissions in the specified time interval(s) within those duration as instructed and reports the results to the CCO. Using this process, a CCO may be able to determine whether potential transmissions from that STA may cause interference to any ongoing or future transmissions, as well as whether any transmissions may potentially cause interference with that STA.

Figure 11:
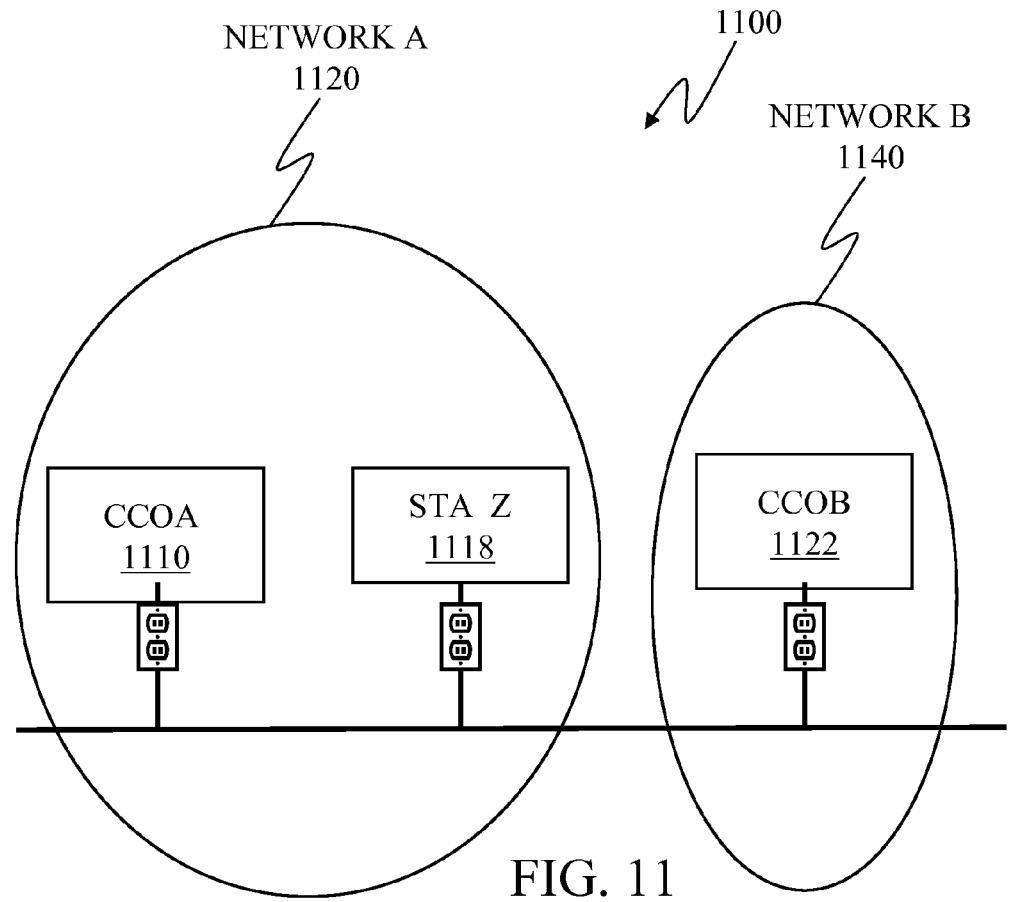
FIG. 11 is another exemplary group of networks according to an embodiment of the invention.
Figure 12:
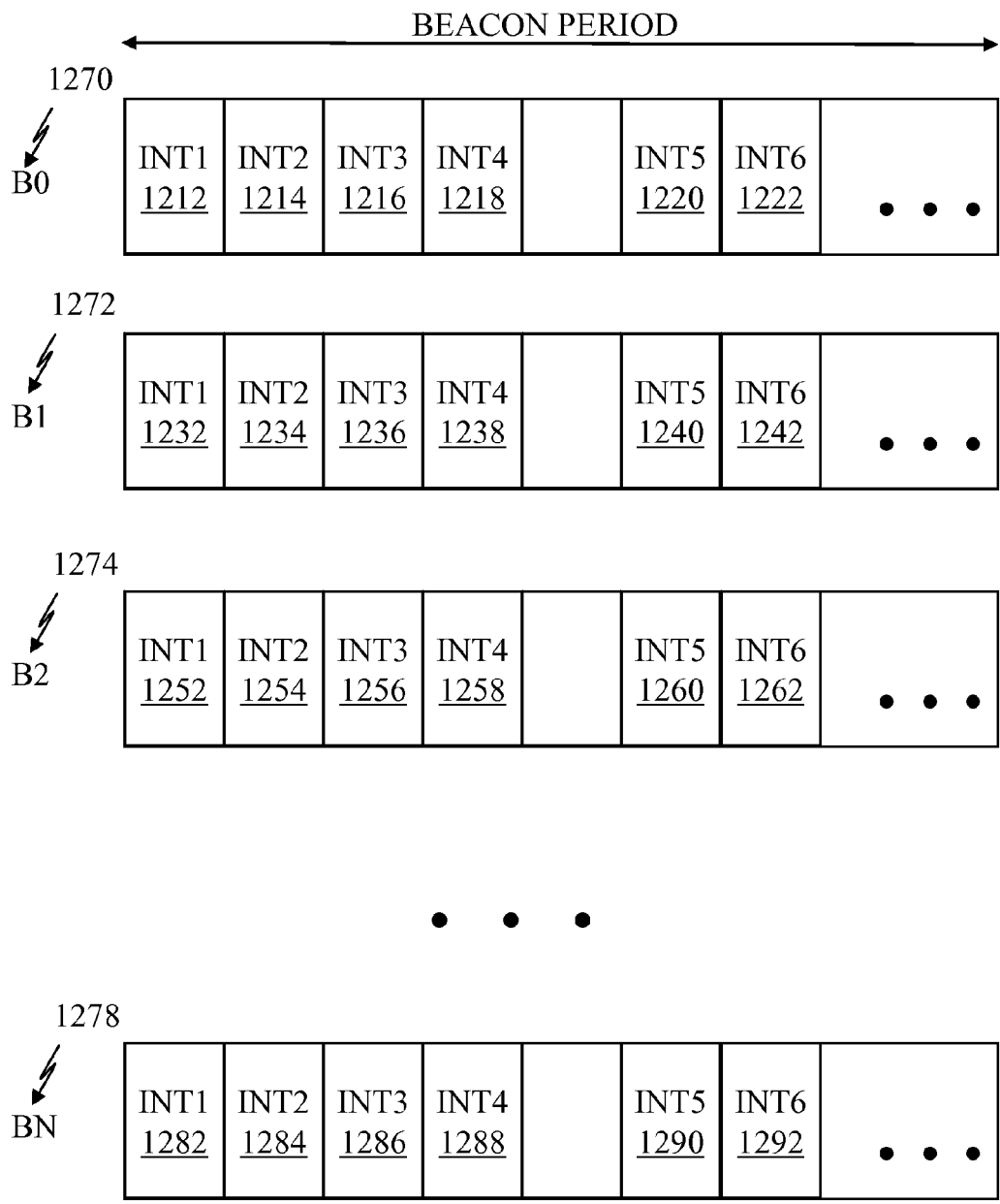
FIG. 12 is an exemplary block diagram showing a number of beacon periods divided into a number of time intervals according to an embodiment of the invention.

FIG. 11 is another exemplary system 1100 that includes a group with two centralized networks 1120, 1140. FIG. 12 shows exemplary beacon periods, B0 1270, B1 1272, B2 1274, BN 1278 divided into various time intervals or time slots 1212, 1214, 1216, 1218, 1220, 1222, 1232, 1234, 1236, 1238, 1240, 1242, 1252, 1254, 1256, 1258, 1260, 1262, 1282, 1284, 1286, 1288, 1290, 1292. FIGS. 11 and 12 are discussed together.

In some embodiments, it is possible that the CCO of a centralized network 1120, e.g., CCOA 1110, is not aware of the existence of a neighbor network, e.g., network B 1140/CCOB 1122. This may be due to several factors, e.g., the two CCOs, CCOA 1110 and CCOB 1122, are just physically located too far apart from each other, hence they are unable to detect each other's beacons. In this exemplary embodiment, CCOA 1110 and CCOB 1122 in general do not directly coordinate with each other. The two CCOs 1110, 1122 are thus hidden from each other.

For illustrative purposes, let us assume that a STA in one of the networks, e.g., STA Z 1118, is able to detect the beacons of the other network, e.g., network B 1140/CCOB 1122. STA Z, however, belongs to network A 1120 and is managed by CCOA 1110. STA Z, for example, may be physically located in between CCOA 1110 and CCOB 1122. In some situations, when CCOA 1110 allocates a contention-free period time interval to STA Z, it is possible that the same time interval is also being used by or allocated by network B 1140. CCOB 1122, for example, may use or allocate that same interval for CFP transmissions or CSMA transmissions for its network 1140. In this exemplary embodiment, STA Z 1118 thus may suffer interference from network B 1140.

A detect-and-report process may be implemented to address this issue. If the topology table of CCOA 1110 indicates that STA Z is able to detect other outside networks, the CCOA 1110 may request STA Z to detect/monitor for any transmissions over certain time interval(s). In this embodiment, CCOA 1110 instructs other STAs, not shown, within its network 1120 to not transmit. This may be implemented, for example, by having CCOA 1110 specify reserved region(s) in that same time interval(s) when STA Z is detecting or monitoring for any transmissions. These reserved region(s), however, are not allocated to any STA in the network 1120, thus, STA Z may freely listen for transmissions, which may only be generated by outside networks, i.e., not from network A, during those time intervals. These outside networks are non-coordinating networks of network A 1120.

Referring to FIG. 12, CCOA 1110 may instruct STA Z to detect or monitor during interval 1 and interval 3, i.e., INT1 1212, 1232 and INT3 1216, 1236, of beacon periods B0 1270 and B1 1272. These same intervals 1212, 1232, 1216, 1236 may be assigned by CCOA 1110 as reserved periods, intervals, or time slots for its own network A 1120, but not to any STA in the network 1120.

After the defined detecting intervals 1212, 1232, 1216, 1236 and duration/beacon periods, STA Z reports the results to the CCO. If STA Z reports that STA Z is able to detect transmissions during those detecting intervals 1212, 1232, 1216, 1236, CCOA 1110 may request another detect-and-report process at other time intervals, e.g., interval 3 and interval 5 of beacon periods B2 and B7 (not shown), until CCOA 1110, with the assistance of STA Z 1118, is able to find a time interval or intervals wherein there are no transmissions from non-coordinating networks.

If STA Z, however, reports and informs CCOA that STA Z did not detect any transmission during those detecting period(s), CCOA 1110 may allocate that time intervals, interval 1 and interval 3, e.g., at some future beacon periods 1252, 1256, 1282, 1286, to STA Z.

Figure 13:
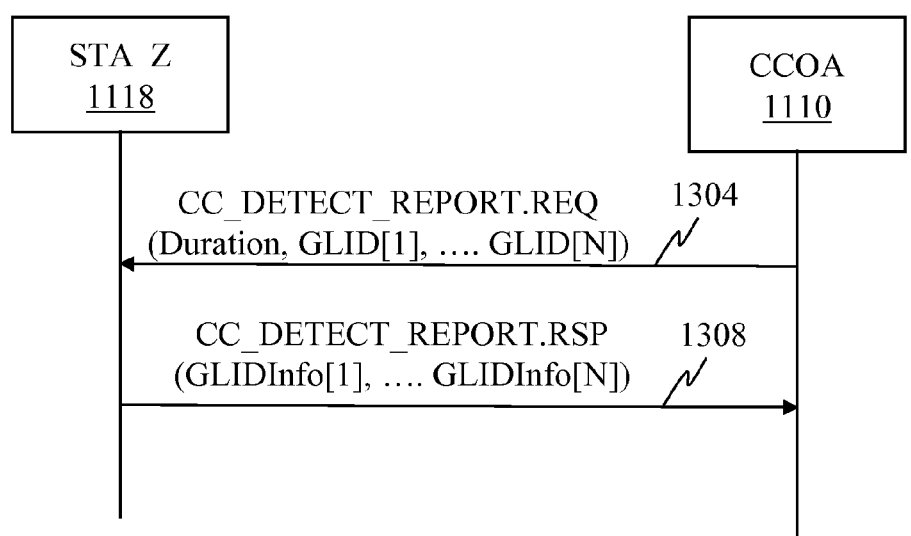
FIG. 13 is a data flow of exemplary messages that are exchanged for a detect-and-report procedure according to an embodiment of the invention.

FIG. 13 is an exemplary data flow showing how exemplary messages may be exchanged to implement the detect-and-report procedure. In general, the CCO, e.g., CCOA 1110, typically initiates this procedure by sending an exemplary CC_DETECT_REPORT.REQ 1304 message to a STA, e.g., STA Z 1118. The message may contain a field indicating the detecting duration(s), i.e., how long the detecting period is to last, and one or more global identifier (GLID) fields. Each GLID is typically associated with a start and end time—e.g., a time interval, thereby indicating when the detected time interval(s) are to occur. During those specified detect time interval(s), which may be contiguous or not contiguous with each other, the STA detects or listens for any ongoing transmissions.

After the defined detect time intervals(s), the STA then sends a response to the CCO via an exemplary CC_DETECT_REPORT.RSP message 1308, indicating the results of the detect-and-report procedure. This response message 1308 may contain the type of transmissions (e.g., no transmissions, contention-free transmissions, and/or contention-based transmissions) that the STA detected during those detect time intervals. In some embodiments, the response may also include the signal level of each detected transmission and the bit loading estimate(s).

The detect-and-report procedure may also be useful in bandwidth allocation or scheduling. Upon receiving a connection request, for e.g., via a global link set-up request (CC_LINK_NEW.REQ) message from a STA, if the topology table of the CCO indicates that the STA(s) requesting or associated with the global link set-up request are able to detect stations in other networks that are not coordinating with the CCO, the CCO may request the STA(s) to perform the detect-and-report procedure over some specified detect time interval(s). If the STA(s) report that contention-free links or connections are not detected during the time interval(s), the CCO may allocate that same time interval(s) to the STAs and indicate to the STAs that request to send (RTS) and clear to send (CTS) messages may have to be transmitted/received. However, if the STA(s) report that contention-free links are detected, this information indicates that any potential transmissions from and by the STA(s) may interfere with the ongoing contention-free transmissions of non-coordinating networks and, therefore, the CCO may, if so decide, not to allocate that time interval to the STAs.

To ensure that a STA's CSMA transmissions do not interfere with CFP allocations of non-coordinating CCOs, in some embodiments, that STAs are typically instructed to defer from transmitting during intervals in the CSMA allocation where CFP transmissions have been detected in previous beacon periods.

Table V below shows exemplary fields of the exemplary detect-and-report request message, e.g., CC_DETECT_REPORT.REQ.

TABLE V

Exemplary CC_DETECT_REPORT.REQ Message

| Exemplary Field | Octet Number | Field Size (Octets) | Definition |
|---|---|---|---|
| Duration | 0 | 1 | Amount of time to detect for ongoing transmissions, in units of number of Beacon Periods. "00" = zero Beacon Periods, "01" = one Beacon Period, and so on |
| NumGLID | 1 | 1 | The number of GLID fields in this message (=N). The maximum value for this field is 8. "00" = none "01" = one, and so on Each GLID is associated with a start and end time. |
| GLID[1] | 2 | 1 | The first GLID to perform the detect-and-report procedure. |
| ... | ... | ... | ... |
| GLID[N] | N + 1 | 1 | The last GLID to perform the detect-and-report procedure. |

Table VI below shows exemplary fields of the exemplary detect-and-report response message, e.g., CC_DETECT_REPORT.RSP.

TABLE VI

Exemplary CC_DETECT_REPORT.RSP Message

| Exemplary Field | Octet Number | Field Size (Octets) | Definition |
|---|---|---|---|
| NumGLID | 0 | 1 | Number of GLIDInfo() in this message (=N). "00" = none "01" = one, and so on |
| GLIDInfo[1] | 1-6 | 6 | Information about the first GLID (see Table VII) |
| ... | ... | ... | ... |
| GLIDInfo[N] | — | 6 | Information about the last GLID (see Table VII) |

Table VII below shows exemplary format of a GLIDInfo field.

TABLE VII

Exemplary GLIDInfo Format

| Exemplary Field | Octet Number | Field Size (Octets) | Definition |
|---|---|---|---|
| GLID | 0 | 1 | GLID corresponding to this GLIDInfo[ ]. |
| CFDetected | 1 | 1 | "00" = Contention-free Frame Controls are not detected. "01" = Contention-free Frame Controls are detected. |

TABLE VII-continued

Exemplary GLIDInfo Format

| Exemplary Field | Octet Number | Field Size (Octets) | Definition |
| --- | --- | --- | --- |
| CSMADetected | 2 | 1 | "00" = Contention-based Frame Controls are not detected. "01" = Contention-based Frame Controls are detected. |
| OthersDetected | 3 | 1 | "00" = other unknown types of transmissions are not detected. "01" = other unknown types of transmissions are detected. |
| Signal Level | 4 | 1 | "00" = information not available "01" = signal level is >−10 dB, but ≦0 dB (relative to full transmit power, −50 dBm/Hz) "02" = signal level is >−15 dB, but ≦−10 dB "03" = signal level is >−20 dB, but ≦−15 dB . . . "08" = signal level is >−75 dB, but ≦−70 dB "09" = signal level is <−75 dB |
| Average BLE | 5 | 1 | Average BLE. Average BLE may be estimated based on Discover Beacon reception. This field is typically set to zero if not provided. Providing a non-zero value is optional. |

Figure 14:
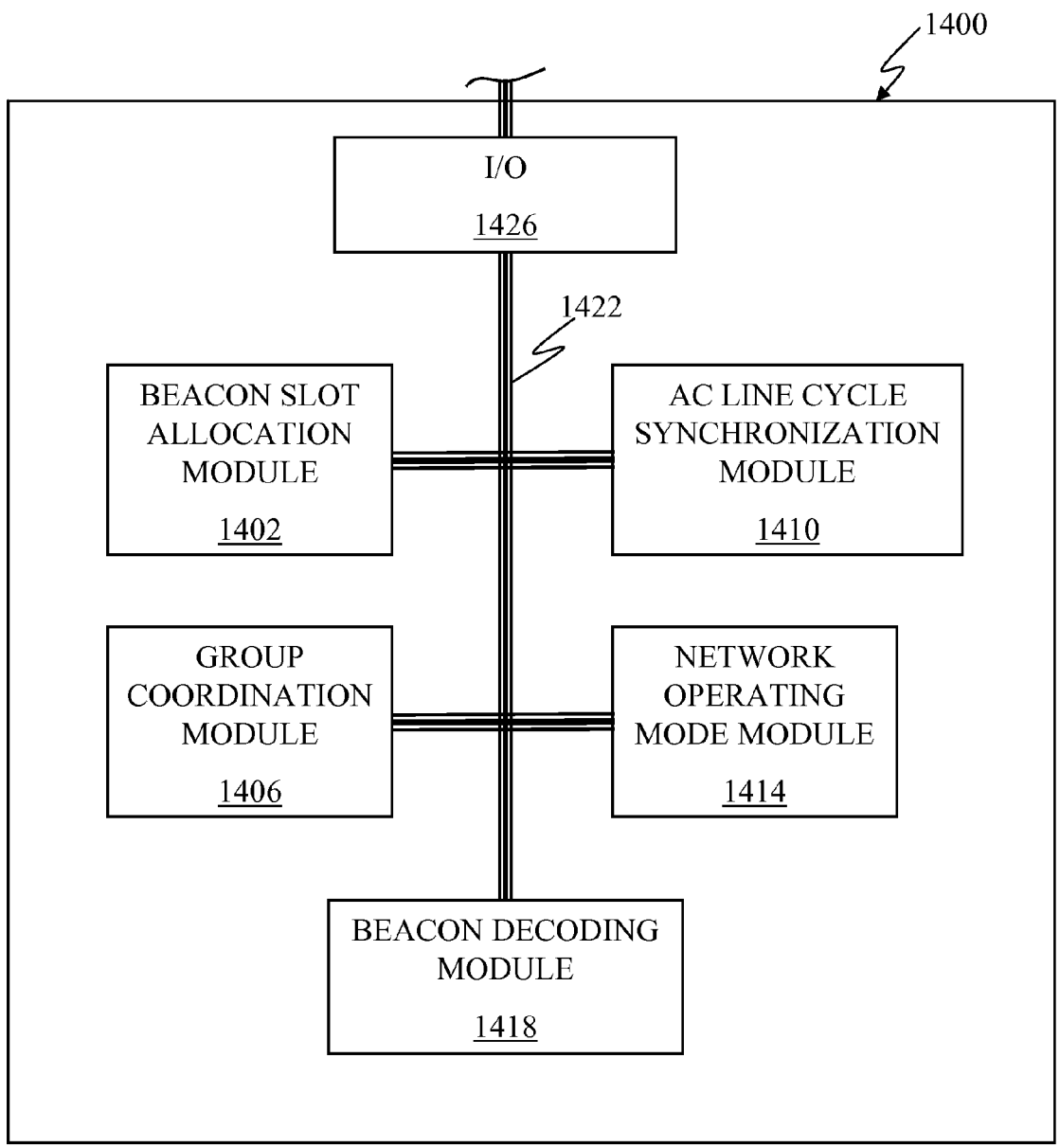
FIG. 14 is a high-level block diagram of an exemplary central coordinator according to an embodiment of the invention.

FIG. 14 is a high-level block diagram of an exemplary central coordinator 1400 according to an embodiment of the invention. In some embodiments, the central coordinator 1400 includes a beacon slot allocation module 1402, a group coordination mode module 1406, an AC line cycle synchronization module 1410, a network operating module 1414, and a beacon decoding module 1418. In some embodiments, a bus 1422 connects the various interface modules. In some embodiments, an I/O interface 1426 couples the CCO 1400 to the network, enabling communication with other devices in the network. In general, the beacon slot allocation module 1402 allocates one or more beacon slots, and associates each of the beacon slots to a unique network, such that there is typically a one-to-one correspondence between the number of beacon slots and the number of networks in a group operating in the coordinated mode. Each network in the coordinated mode thus has a unique beacon slot to transmit its own beacon or beacons. The beacon slot allocation module 1402 also performs the function of increasing as well as decreasing the allocated beacon slots, which may be in response to requests by other CCOs.

The AC line cycle synchronization module 1410 typically tracks and monitors the AC line cycle, sets appropriate fields, and synchronizes the various networks to the AC line cycle, if appropriate. The network operating mode module 1414 determines the operating mode a network should use, including transitions between the coordinated mode and uncoordinated mode, and vice versa. The beacon decoding module 1418 typically detects and decodes beacons. The group coordination module 1406 performs the functions related to the coordination of two of more groups of networks, for example, by allocating one or more protected regions in a beacon.

In some embodiments, not shown, a device, e.g., a station and/or a central coordinator, may include a detect-and-report procedure module that performs the features of the detect-and-report procedure discussed above.

Although this invention has been disclosed in the context of certain embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, e.g., order of steps may be changed, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above.

We claim:

1. A method of synchronizing one or more networks in a first group, each of the one or more networks comprising a central coordinator, each central coordinator adapted to operate in an operating mode selected from a group consisting of uncoordinated mode and coordinated mode, each central coordinator adapted to transition from the uncoordinated mode to the coordinated mode or from the coordinated mode to the uncoordinated mode, the method comprising the steps of:

allocating one or more beacon slots wherein each of the allocated one or more beacon slots is associated with a unique network from the one or more networks in the first group;

transmitting at least one beacon at the allocated beacon slot by the associated network, wherein the at least one beacon comprises network allocation and scheduling information;

wherein one slot of the one or more beacon slots is a master slot synchronized to an alternating current (AC) line cycle functioning as a master timing sequence;

detecting one or more beacons;

decoding the one or more detected beacons; and transitioning, by the central coordinator of at least one of the one or more networks in the first group, from the coordinated mode to the uncoordinated mode or from the uncoordinated mode to the coordinated mode based on the one or more beacons detected; wherein the coordinated mode is associated with distinct time slots.

2. The method of claim 1 wherein the transmitting step is over a power line medium.

3. The method of claim 1 wherein at least one of the one or more beacon slots that is not the master slot is synchronized to the AC line cycle based on the master slot.

4. The method of claim 1 further comprising the step of:
allocating an additional beacon slot associated with a new network joining the first group.

5. The method of claim 1 further comprising the step of:
releasing one of the allocated beacon slots, wherein the released beacon slot is adapted to be used by an incoming new network.

6. The method of claim 1 further comprising the step of:
coordinating the first group with a second group, wherein the second group comprises one or more second group networks.

7. The method of claim 1 wherein the master slot is synchronized to the AC line cycle by determining a point in the AC line cycle.

8. The method of claim 1 wherein the AC line cycle is synchronized with a digital phase locked loop detection.

9. The method of claim 1, wherein the master slot is synchronized to the AC line cycle by determining a point in the AC line cycle and an offset.

10. The method of claim 1 wherein the step of allocating one or more beacon slots includes updating one or more slot usage fields.

11. The method of claim 1 further comprising the step of:
determining a location of one future beacon based on the AC line cycle.

12. The method of claim 1 further comprising the step of:
determining when one of the one or more networks is shutting down based on the AC line cycle.

13. The method of claim 1 wherein the one or more beacon slots are scheduled within a beacon region with a defined number of beacon slots.

14. The method of claim 1 wherein the one or more beacon slots are scheduled within a beacon region with a variable number of beacon slots.

15. A device comprising:
a beacon slot allocation module adapted to:
allocate one or more beacon slots, wherein each of the allocated one or more beacon slots are each associable with a respectively unique network, each unique network comprising a central coordinator, and wherein one slot of the one or more beacon slots is a master slot synchronized to an alternating current (AC) line cycle functioning as a master timing sequence; and release an allocated one or more beacon slots, wherein the released beacon slot is adapted to be associated with another new network;
an alternating current (AC) line cycle synchronization module adapted to:
monitor the AC line cycle; and
synchronize at least one of the allocated one or more beacon slots to the AC line cycle;
a beacon decoding module adapted to:
decode one or more detected beacons;
a network operating mode module adapted to:
determine, based on at least one of the decoded one or more beacons, the network operating mode selected from a group consisting of coordinated mode and uncoordinated mode; wherein coordinated mode associated with distinct time slots; and
transition, from the coordinated mode to the uncoordinated mode or from the uncoordinated mode to the coordinated mode based on the one or more beacons detected.

16. The device of claim 15 further comprising:
a group coordination module adapted to coordinate one or more groups.

17. The device of claim 15 adapted to communicate over a power line network medium.

18. A system comprising:
one or more networks in a first group; wherein each network comprises a central coordinator controlling its corresponding network; wherein each network is configured to operate in a mode selected from a group consisting of a coordinated mode and an uncoordinated mode and is configured to transition between a coordinated mode and an uncoordinated mode, wherein the coordinated mode is associated with distinct time slots; each of the central coordinators adapted to decode one or more detected beacons; each of the central coordinators adapted to allocate one or more beacon slots within a beacon region, wherein each of the allocable one or more beacon slots is associable with a unique network from the one or more networks, and wherein at least one of the one or more beacon slots is a master slot synchronized to an alternating current line cycle functioning as a master timing sequence; and
a power line communication network medium operably coupled to the one or more networks.

19. The system of claim 18 wherein the one or more beacon slots within the beacon region is a variable number of beacon slots.

* * * * *